(12) United States Patent
Okada et al.

(10) Patent No.: US 10,732,095 B2
(45) Date of Patent: Aug. 4, 2020

(54) PARTICLE IMAGING DEVICE AND PARTICLE IMAGING METHOD

(71) Applicant: Sysmex Corporation, Kobe-shi, Hyogo (JP)

(72) Inventors: Masaya Okada, Kobe (JP); Shigeki Iwanaga, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 95 days.

(21) Appl. No.: 15/267,663

(22) Filed: Sep. 16, 2016

(65) Prior Publication Data

US 2017/0082531 A1 Mar. 23, 2017

(30) Foreign Application Priority Data

Sep. 18, 2015 (JP) ................................. 2015-186070

(51) Int. Cl.
*G01N 21/05* (2006.01)
*G01N 15/14* (2006.01)
(Continued)

(52) U.S. Cl.
CPC ....... *G01N 15/147* (2013.01); *G01N 15/1434* (2013.01); *G01N 15/1436* (2013.01); *G01N 15/1475* (2013.01); *G01N 21/05* (2013.01); *G01N 21/6428* (2013.01); *G01N 21/6456* (2013.01); *G01N 2015/0065* (2013.01); *G01N 2015/1006* (2013.01); *G01N 2015/1445* (2013.01); *G01N 2015/1472* (2013.01); *G01N 2021/6439* (2013.01);
(Continued)

(58) Field of Classification Search
CPC ............. G01N 15/147; G01N 15/1475; G01N 2015/1438; G01N 21/6465
See application file for complete search history.

(56) References Cited

U.S. PATENT DOCUMENTS 5,835,211 A    11/1998  Wells et al.
8,603,396 B2 * 12/2013  Sharpe ............... G01N 15/1459
                                                422/68.1
(Continued)

FOREIGN PATENT DOCUMENTS

CN       102906557 A     1/2013
JP       2004-520569 A   7/2004
(Continued)

OTHER PUBLICATIONS

A. K. Glaser, Y. Wang, and J. T.C. Liu, "Assessing the imaging performance of light sheet microscopies in highly scattering tissues," Biomed. Opt. Express 7, 454-466 (2016).*
(Continued)

*Primary Examiner* — Rebecca C Bryant
(74) *Attorney, Agent, or Firm* — Brinks Gilson & Lione

(57) ABSTRACT

A particle imaging device comprises a flow cell, a light source, an irradiation optical system configured to form a light sheet on the flow cell, a light collecting optical system and an imaging element. The sheet surface of the light sheet is perpendicular to the exterior side surface of the flow cell to which the light is entered from the light source. The sheet surface of the light sheet is inclined at a predetermined angle that is not perpendicular to the flow direction of the sample.

21 Claims, 18 Drawing Sheets

(51) Int. Cl.
*G01N 21/64* (2006.01)
*G01N 15/00* (2006.01)
*G01N 15/10* (2006.01)

(52) U.S. Cl.
CPC ............... *G01N 2201/0612* (2013.01); *G01N 2201/0697* (2013.01); *G01N 2201/12* (2013.01)

(56) References Cited

U.S. PATENT DOCUMENTS

| | | | |
|---|---|---|---|
| 9,068,916 B2* | 6/2015 | Heng | ............... G01N 15/147 |
| 2002/0028434 A1 | 3/2002 | Goix et al. | |
| 2009/0025489 A1* | 1/2009 | Christensen | ......... G01N 21/645 73/864 |
| 2009/0121165 A1 | 5/2009 | Aroussi | |
| 2010/0278400 A1 | 11/2010 | Piestun et al. | |
| 2011/0222051 A1 | 9/2011 | Heng | |
| 2014/0340483 A1 | 11/2014 | Ritter et al. | |
| 2014/0353522 A1 | 12/2014 | Wu et al. | |
| 2015/0323787 A1 | 11/2015 | Yuste et al. | |

FOREIGN PATENT DOCUMENTS

| | | |
|---|---|---|
| JP | 5259916 B2 | 5/2013 |
| JP | 2013-522629 A | 6/2013 |
| JP | 2014-224814 A | 12/2014 |
| WO | WO 2005/062018 A2 | 7/2005 |
| WO | WO 2007/119263 A2 | 10/2007 |
| WO | WO 2011/059833 A2 | 5/2011 |
| WO | WO 2011/116003 | 9/2011 |
| WO | 2014/117079 A1 | 7/2014 |

OTHER PUBLICATIONS

Jianglai Wu, Jianping Li, and Robert K.Y. Chan, "A light sheet based high throughput 3D-imaging flow cytometer for phytoplankton analysis," Opt. Express 21, 14474-14480 (2013).*
Mohan, K. et al., "Three Dimensional Fluorescence Imaging Using Multiple Light-Sheet Microscopy", *PLOS One*, vol. 9, No. 6, Jun. 2014, 8 pages.
Regmi, R. et al., "High Resolution Light-Sheet Based High-Throughput Imaging Cytometry System Enables Visualization of Intra-Cellular Organelles", *AIP Advances*, No. 4, 2014, 8 pages.
Chinese Office Action dated Mar. 26, 2019 in a counterpart Chinese patent application No. 201610827528.5.
Japanese Office Action dated Jul. 23, 2019 in a counterpart Japanese patent application No. 2015-186070.
Japanese Office Action dated Dec. 24, 2019 in a counterpart Japanese patent application No. 2015-186070.
Chinese Office Action dated Sep. 12, 2019 in a counterpart Chinese patent application No. 201610827528.5.
Communication pursuant to Article 94(3) EPC dated Jan. 24, 2020 in a counterpart European patent application No. 16188497.8.
Chinese Office Action dated Mar. 16, 2020 in a counterpart Chinese patent application No. 201610827528.5.
Decision of Refusal dated Jun. 16, 2020 in a counterpart Japanese patent application No. 2015-186070.

* cited by examiner

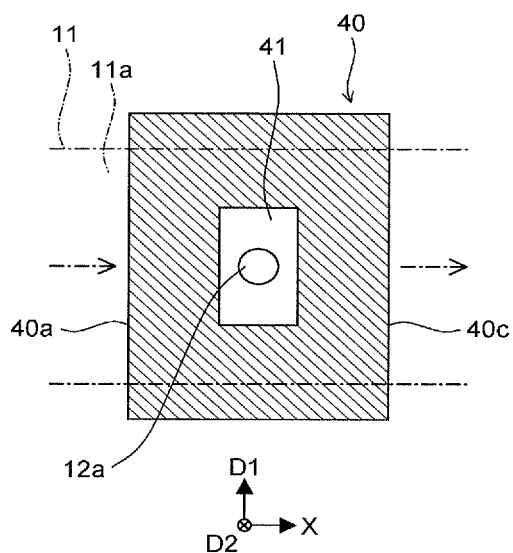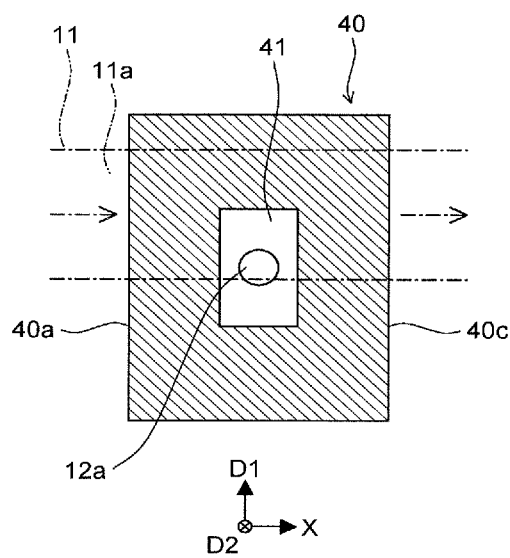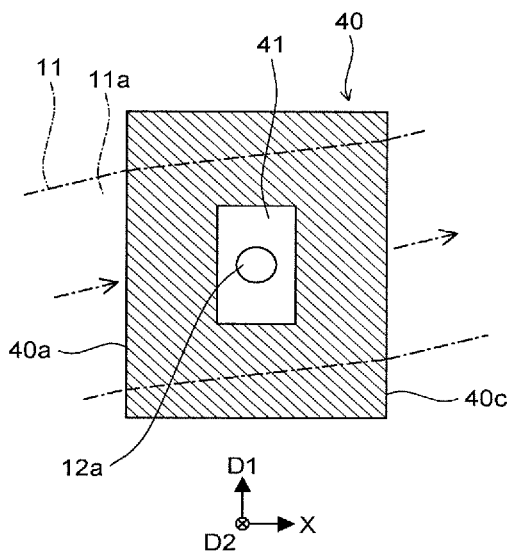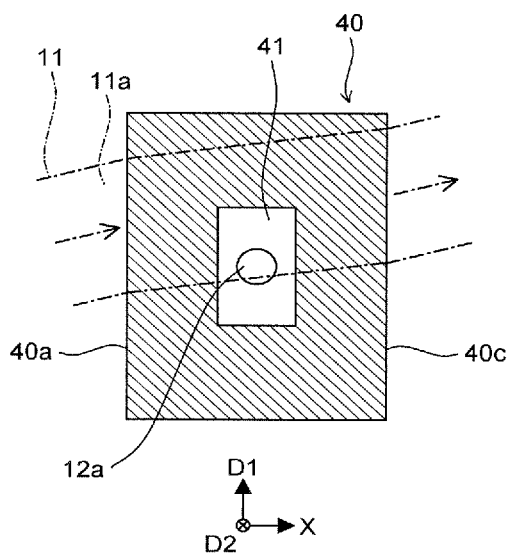

Second Embodiment

Fourth Embodiment

Fifth Embodiment

Reference Example

Sixth Embodiment

Seventh Embodiment

PARTICLE IMAGING DEVICE AND PARTICLE IMAGING METHOD

CROSS REFERENCE TO RELATED APPLICATIONS

This application claims priority from prior Japanese Patent Application No. 2015-186070, filed on Sep. 18, 2015, entitled "PARTICLE IMAGING DEVICE AND PARTICLE IMAGING METHOD", the entire contents of which are incorporated herein by reference.

FIELD OF THE INVENTION

The invention related to a particle imaging device and particle imaging method.

BACKGROUND

"Raju Regmi et al, 2014 High resolution light-sheet based high-throughput imaging cytometry system enables visualization of intra-cellular organelles, AIP ADVANCES 4, 097125" describes a device that irradiates a light sheet emitted from an excitation objective lens on a sample in a flow cell from a direction that is inclined in the flow direction of the sample, and directs the fluorescent light given off by the sample to a camera through a detection objective lens arranged in a direction perpendicular to the direction of the flow of the sample.

However, in "Raju Regmi et al, 2014 High resolution light-sheet based high-throughput imaging cytometry system enables visualization of intra-cellular organelles, AIP ADVANCES 4, 097125", the thickness of the light sheet increases and the shape of the light sheet beam is disrupted when the light sheet passes through the flow cell. When the light sheet that has a disrupted beam shape irradiates the sample, a problem arises in that the accuracy of the captured image is reduced. Therefore, a device capable of capturing a more accurate image is required.

SUMMARY OF THE INVENTION

The scope of the present invention is defined solely by the appended claims, and is not affected to any degree by the statements within this summary.

A first aspect of the invention is a particle imaging device. The particle imaging device of this aspect includes a flow cell for flowing a sample containing particles, light source, irradiation optical system for forming a light sheet on the flow cell from the light emitted from the light source, light collecting optical system for collecting light given off from the particles, and imaging element for receiving the light collected by the light collecting optical system. The sheet surface of the light sheet is perpendicular to the exterior side surface of the flow cell that is impinged by the light emitted from the light source. The sheet surface of the light sheet is inclined at a predetermined angle that is not perpendicular to the flow direction of the sample.

A second aspect of the invention is a particle imaging method. The particle imaging method of this aspect includes forming a light sheet that is perpendicular to the exterior side surface of a flow cell through which flows a sample containing particles and is inclined at a predetermined angle that is not perpendicular to the direction of the flow of the sample, and imaging the particles contained in the sample.

According to the invention, high precision images can be captured.

BRIEF DESCRIPTION OF THE DRAWINGS

FIG. 2 (b) shows the optical lens of the first embodiment in the inclined state;

FIG. 2 (c) is a schematic view of the cross section of the light sheet flow path and flow cell of the first embodiment when viewed in the X-axis negative direction;

FIG. 2 (d) is a schematic view of the cross section of the flow cell and light sheet of the first embodiment when viewed in a first direction;

FIG. 3 (a) is a schematic view of the cross section of the flow cell and light sheet of the first embodiment when viewed in a second direction;

FIG. 3 (b) through (d) are schematic views of the cross section of the flow cell and light sheet in a modification of the first embodiment when viewed in the second direction;

FIG. 4 (b) is a schematic view showing the relationship between the exterior side surface of the flow cell and the sheet surface of the light sheet in a modification of the first embodiment;

FIG. 8 (b) is a flow chart showing the process of applying the optimum angle to the particle imaging device of the first embodiment;

FIG. 10 (b) illustrates the effect by the phase modulating element in the second embodiment;

FIG. 12 (b) is a schematic view of the cross section of the light sheet flow path and flow cell of the third embodiment when viewed in the X-axis negative direction;

FIG. 12 (c) is a schematic view of the light sheet irradiated on the flow cell in the third embodiment when viewed in the Y-axis positive direction;

FIG. 13 (b) is a schematic view showing the area in which two-photon excitation is possible in a modification of the fourth embodiment;

FIG. 14 (b) is a schematic view of the light sheet irradiated on the flow cell in the fifth embodiment when viewed in the Y-axis positive direction;

FIG. 16 (b) illustrates the structure of the optical element and a beam stopper of the sixth embodiment;

FIG. 17 (b) is a schematic view of the light sheet irradiated on the flow cell in the sixth embodiment when viewed in the Y-axis positive direction;

FIG. 18 (b) is a schematic view of the flow cell in the seventh embodiment when viewed in the Z-axis positive direction.

DETAILED DESCRIPTION OF THE PREFERRED EMBODIMENTS

First Embodiment

The first embodiment applies the invention to a particle imaging device that obtains a plurality of images by imaging the fluorescent light given off from a particle irradiated by light, and generates a 3-dimensional image of a particle based on the plurality of obtained images. In the first embodiment, the particles to be imaged are the nucleus in a cell, HER2 gene, and CEP17 which is the centromere region of the 17th chromosome. Further, the particle to be imaged also may be another gene, nucleic acid, cytoplasm, protein, subcellular organelle and the like, or other part of a cell. The particle to be imaged also may be the cell itself. For example, the particle to be imaged also may be a circulating tumor cell (CTC), circulating endothelial cell (CEC), endothelial progenitor cell (EPC), mesenchymal stem cell (MSC), hematopoietic stem cell (HSC), antigen-specific T cell and the like.

The particle to be imaged is not limited to cells and also may be a particle other than a cell. For example, the particle to be imaged also may be a particle from a non-cellular biologically derived particle, particle that transmits light such as fluorescent beads and the like. That is, the particle to be imaged also may be a particle that gives off light toward the exterior side of a flow cell when irradiated by light having a light transmitting property.

Figure 1:
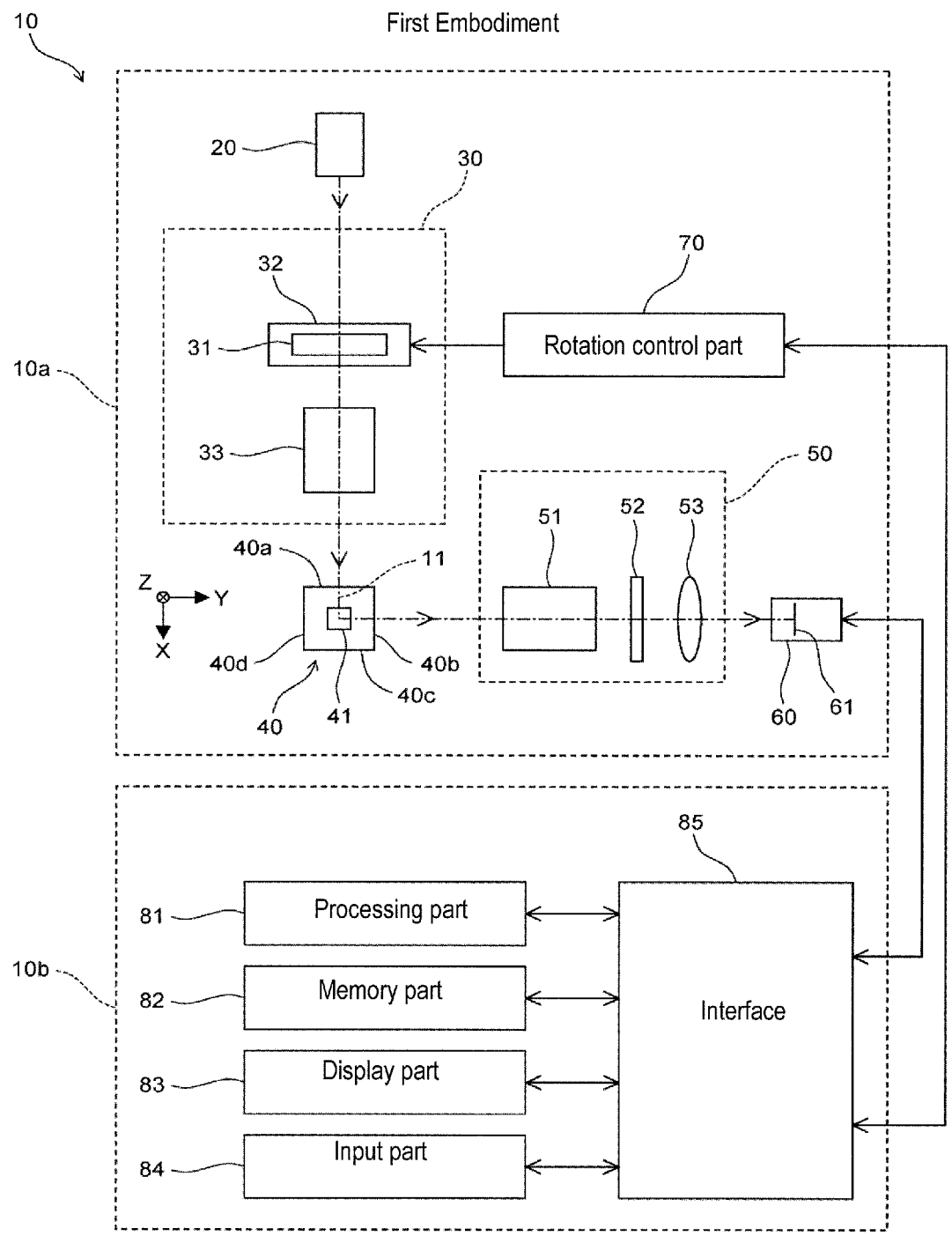
FIG. 1 shows the structure of the particle imaging device of the first embodiment.

As shown in FIG. 1, a particle imaging device 10 has an imaging part 10a, and an information processing device 10b. The imaging part 10a includes a light source 20, irradiation optical system 30, flow cell 40, light collecting optical system 50, imaging element 60, and rotation control part 70. The irradiation optical system 30 includes an optical lens 31, rotation device 32, objective lens 33. The light collecting optical system 50 includes an objective lens 51, light receiving filter 52, and condensing lens 53. FIG. 1 shows the XYZ axes for describing the arrangement of each part of the imaging part 10a. The XYZ axes are mutually perpendicular to each other. The XYZ axes shown in the drawings below correspond to the XYZ axes respectively shown in FIG. 1.

The light source 20 emits light in the X-axis positive direction to irradiate light on a sample flowing through the flow cell 40. The light source 20 is, for example, a semiconductor laser light source. The wavelength of the light emitted from the light source 20 is set at a wavelength of light that will excite fluorescence from a fluorescent dye used to stain a cell. The optical lens 31 converges the light emitted from the light source 20 as described later. The rotation device 32 supports the optical lens 31 so as to be rotatable. The rotation device 32 rotates the optical lens 31 around the center axis of the light emitted from the light source 20, that is, around the optical axis of the irradiation optical system 30 in the optical lens 31.

Figure 2:
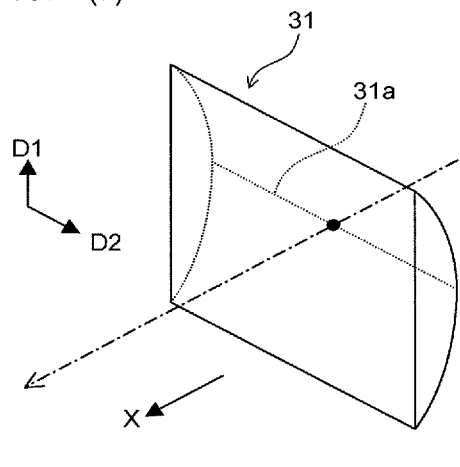
FIG. 2 (a) shows the structure of the optical lens of the first embodiment.
Figure 2:
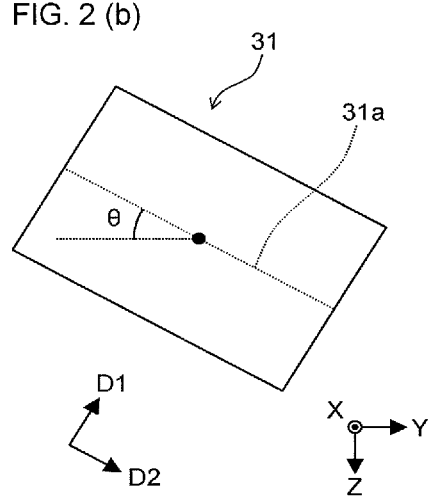
Figure 2:
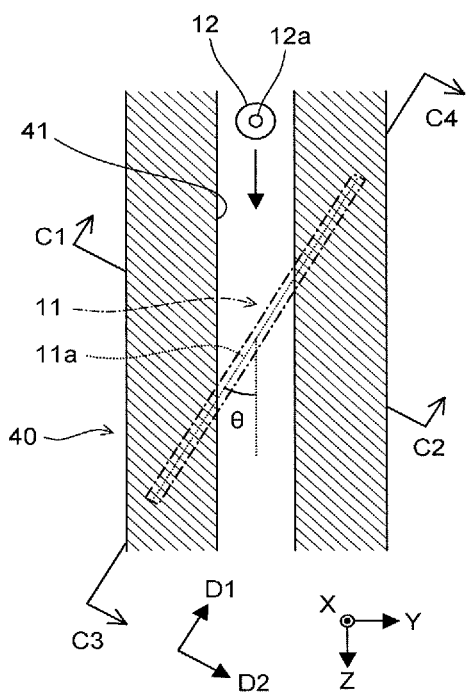
Figure 2:
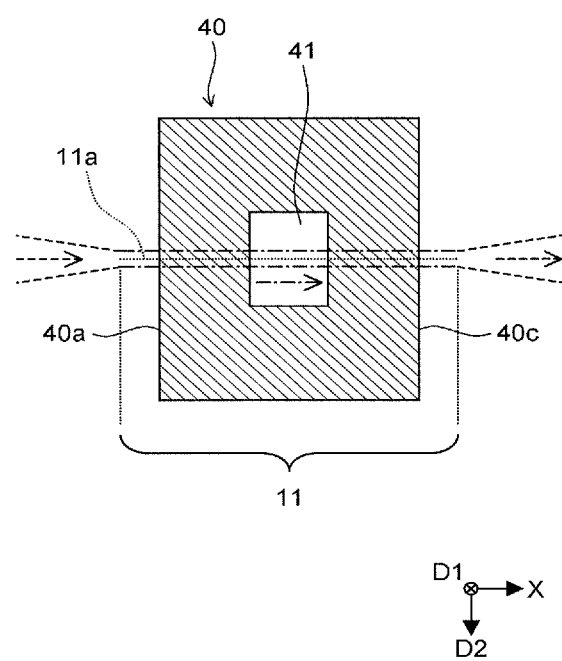

As shown in FIG. 2 (a), the optical lens 31 is a cylindrical lens. The X-axis positive side of the optical lens 31 is a flat surface, and the X-axis negative side of the optical lens 31 is a curved surface. The optical lens 31 is supported by the rotation device 32 so that the surface of the X-axis positive side is perpendicular to the X axis, and the center axis of the light entering the optical axis 31 intersects the generating line 31a of the optical lens 31. Although the optical lens 31 is configured so that the flat surface is positioned on the X-axis positive side and the curved surface is positioned on the X-axis negative side as described above, the optical lens 31 also may be configured so that the curved surface is positioned on the X-axis positive side and the flat surface is positioned on the X-axis negative side.

The optical lens 31 converges the light emitted from the light source 20 so that the convergence of light in a first direction D1 and the convergence of light in a second direction D2 that intersects the first direction D1 are different. Specifically, the first direction D1 is a direction perpendicular to the X axis and generating line 31a, and the second direction D2 is a direction parallel to the generating line 31a. The optical lens 31 converges only the light emitted from the light source 20 in the first direction D1 and does not converge that light in the second direction D2. The light converged in the first direction D1 by the optical lens 31 is collected near the pupil of the objective lens 33.

As shown in FIG. 2 (b), the optical lens 31 is rotated around the X axis by the rotation device 32 and is positioned at the rotation position where the angle relative to the generating line 31a relative to the Y axis is a predetermined angle θ. Therefore, the optical lens 31 converges the light emitted from the light source 20 only in the first direction D1 that is inclined relative to the Z axis, as shown in FIG. 2 (b).

Returning to FIG. 1, the objective lens 33 collects the light transmitted through the optical lens 31 on the flow path 41 of the flow cell 40. Specifically, the objective lens 33 converges the light transmitted through the optical lens 31 so that the convergence position in the second direction D2 shown in FIG. 2 (b) is positioned on the flow path 41 of the flow cell 40. The objective lens 33 also converges the light transmitted through the optical lens 31 so that the spread of the light in the first direction D1 shown in FIG. 2 (b) is rendered parallel. Therefore, the light transmitted through the objective lens 33 becomes a flat beam on the flow path 41 of the flow cell 40.

The objective lens 33 also may be omitted. In this case the optical lens 31 would be position at the rotation position rotated 90° around the X axis from the state shown in FIG. 2 (b). Then, the parallel beam is formed on the flow path 41 of the flow cell 40 when the optical lens 31 converges the light emitted from the light source 20 only in one direction.

In this way the irradiation optical system 30 collects the light emitted from the light source 20 so as to form a straight line shape at the cross section parallel to the YZ plane at the position of the flow path 41 of the flow cell 40 by the optical lens 31 and the objective lens 33. That is, the irradiation optical system 30 forms a light sheet 11 on the flow cell 40 from the light emitted from the light source 20.

The optical lens 31 also may be a lens with a different convergence of light in the first direction D1 and convergence of light in the second direction D2. The optical lens 31 also may be a phase plate or holographic element. The irradiation optical system 30 also may form a light sheet 11 by forming a Bessel beam through a conical lens or the like, and scanning the formed Bessel beam unidirectionally at high speed via a scanning mirror or the like. In this case the scanning direction of the scanning mirror or the like is a direction other than the Y axis direction and Z axis direction in the YZ plane.

The flow cell 40 has a shape that extends in the Z axis direction, and a square external shape when viewed in the Z axis direction. The flow cell 40 also may have a rectangular external shape rather than a square external shape when viewed in the Z axis direction. The exterior surfaces 40a, 40b, 40c, 40d of the flow cell 40 are flat surfaces. Particularly the exterior side surface 40a on which the light from the light source 20 impinges, and the exterior side surface 40b that transmits the fluorescent light collected by the light collecting optical system 50 (described later) are preferably flat surfaces. In the first embodiment, the exterior side surface 40a on the X-axis negative side and the exterior side surface 40c on the X-axis positive side of the flow cell 40 are parallel to the YZ plane, and the exterior side surface 40b on the Y-axis positive side and the exterior side surface 40d on the Y-axis negative side of the flow cell 40 are parallel to the XZ plane.

A flow path 41 extending in the Z-axis direction is formed within the flow cell 40. The flow cell 40 flows the sample containing cells to the flow path 41. The sample flowing through the flow cell 41 is prepared beforehand based on the cells collected from a subject. In the first embodiment, cell nucleus, HER2 gene, and CEP17 are fluorescent stained during sample preparation. The nucleus is stained by a fluorescent dye capable of specifically staining the nucleus. The HER2 gene and CEP17 are stained by binding fluorescent dye via a nucleic acid probe. The staining dyes that stain the nucleus, HER2 gene, and CEP17 are mutually excited to give off fluorescent light of different wavelengths when irradiated by the light emitted from the light source 20. The cell need not necessarily be fluorescent stained when imaging the fluorescent light given off by autofluorescence.

When the flow oath 41a is viewed in the X-axis negative direction as shown in FIG. 2 (c), the longitudinal direction of the light sheet 11 is inclined relative to the flow of the sample. That is, the light sheet 11 has a shape that extends in the first D1 direction and has a narrow width in the second D2 direction. The light sheet 11 is schematically represented by the long chain lines. The cells 12 contained in the sample flow in the Z-axis positive direction within the flow path 41 of the flow cell 40. At this time the HER2 gene and CEP17 also flow together with the nucleus 12a within the cell 12 in the Z-axis positive direction within the flow path 41. When the cell 12 intersects the light sheet 11, the fluorescent stained parts of the cell 12 give off fluorescent light When the cross section C1-C2 shown in FIG. 2 (c) is viewed in the first direction D1, the cross section is as shown in FIG. 2 (d). As shown in FIG. 2 (d), although the light emitted from the irradiation optical system 30 on the flow cell 40 is parallel rays and does not cross the width of the first direction D1, light does thinly cross the width in the second direction D2. Among the light emitted from the light source 20, the light sheet 11 has a width in the second direction D2 that is sufficiently small relative to the particle. The sheet surface 11a of the light sheet 11 is a flat surface regulated by the first direction D1 and the center axis of the light sheet 11 in the light sheet 11. The sheet surface 11a is schematically represented by the dotted line in FIGS. 2 (c) and (d).

Returning to FIG. 2 (c), the sheet surface 11a of the light sheet 11 is inclined only and angle θ relative to the Z axis and corresponds to the inclination of the optical lens 31. The inclination of the sheet surface 11a relative to the Z axis is set so as to not be substantially perpendicular. In this way a cross section image of the cell 12 is readily obtained from the periphery of the flow cell 40. The sheet surface 11a is set so as to be parallel to the Z axis. In this way a plurality of cross section images can be obtained of the fluorescent stained parts of the cell 12. The sheet surface 11a therefore is inclined as a predetermined angle that is not substantially perpendicular relative to the Z-axis direction that is the direction of the flow of the sample. In this way the fluorescent light given off from the fluorescent stain is readily obtained from the periphery of the flow cell 40, hence, a plurality of cell cross sections can be obtained. The angle θ can be set by rotating the optical lens 31 around the X axis.

In this case the optical axis of the irradiation optical system 30 is perpendicular to the Z axis direction that is the direction of the flow of the sample. In other words, the optical axis of the objective lens 33 is perpendicular to the Z axis, and the center axis of the light emitted from the irradiation optical system 30 and impinging the flow cell 40 is perpendicular to the Z axis. When the cross section C3-C4 shown in FIG. 2 (c) is viewed in the second direction D2, the cross section is as shown in FIG. 3 (a). The sheet surface 11a of the light sheet 11 is perpendicular to the exterior side surface 40a of the flow cell 40 that is impinged by the light emitted from the light source 20. In this way the beam shape irradiating the nucleus 12a through the flow cell 40 is unlikely to collapse since the refraction of the light impinging the flow cell 40 by the flow cell 40 is suppressed. Accordingly, a high precision image can be captured by the imaging element 60 (described later) since the cell is irradiated by the light sheet 11 of a suitable shape.

Note that when the when generating a 3-dimensional image of only part of the nucleus 12a, the width of the light sheet 11 in the first direction D1 also may be set so that the light sheet 11 covers only part of the nucleus 12a being imaged, as shown in FIG. 3 (b). In this case cross section images are obtained of part of the nucleus 12a, and a 3-dimensional image is generated based on the obtained part of the nucleus 12a.

Even though the optical axis of the irradiation optical system 30 is shifted from the perpendicular state relative to the flow direction of the sample, the sheet surface 11a may be perpendicular relative to the exterior side surface 40a of the flow cell 40. In this case, when the cross section C3-C4 shown in FIG. 2 (c) is viewed in the second direction D2, the cross section is as shown in FIG. 3 (c). In FIG. 3 (c), although the optical axis of the irradiation optical system 30 is not perpendicular relative to the flow direction of the sample, the sheet surface 11a is perpendicular relative to the exterior side surface 40a of the flow cell 40 impinged by the light emitted from the light source 20 similar to FIG. 3 (a). In this case, although the light sheet 11 is refracted in the first direction D1 by the exterior side surface 40a, the light sheet 11 is not refracted in the second direction D2. Therefore, the thickness of the light sheet 11 in the second direction D2 is scarcely affected by the exterior side surface 40a of the flow cell 40. Hence, high precision images can be captured by the imaging element 60 since the shape of the beam irradiating the nucleus 12a is unlikely to collapse similar to the case of FIG. 3 (a).

Note that when the when generating a 3-dimensional image of only part of the nucleus 12a, the width of the light sheet 11 in the first direction D1 also may be set so that the light sheet 11 covers only part of the nucleus 12a being imaged, as shown in FIG. 3 (d).

The sheet surface 11a also may be shifted slightly from the perpendicular state relative to the exterior side surface 40a. If the sheet surface 11a is substantially perpendicular relative to the exterior side surface 40a, collapse of the beam shape irradiating the cell 12 can be inhibited and high precision images can be captured by the imaging element 60.

Figure 4:
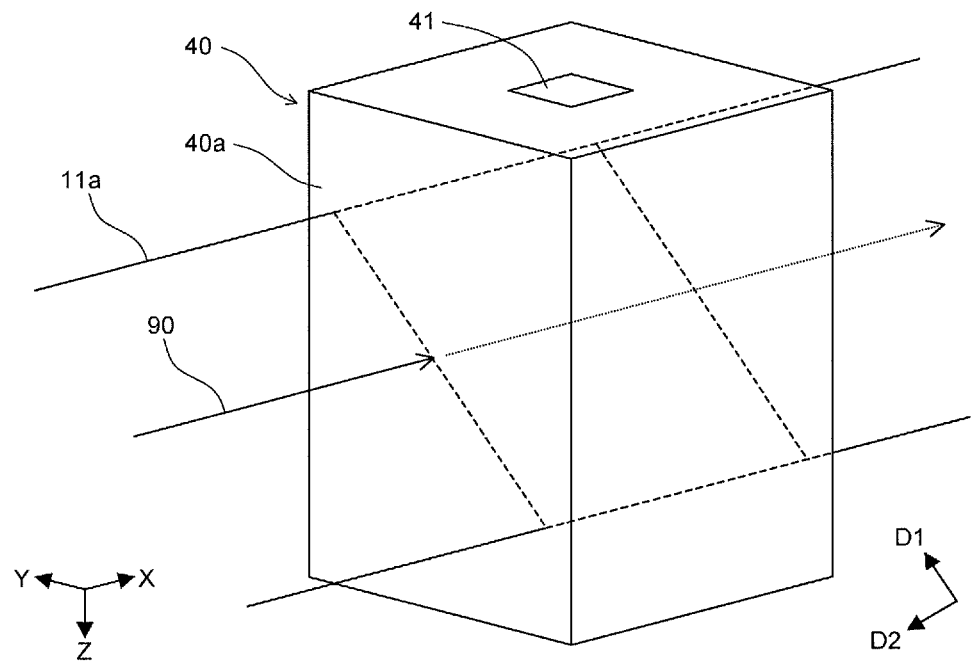
FIG. 4 (a) is a schematic view showing the relationship between the exterior side surface of the flow cell and the sheet surface of the light sheet of the first embodiment.
Figure 4:
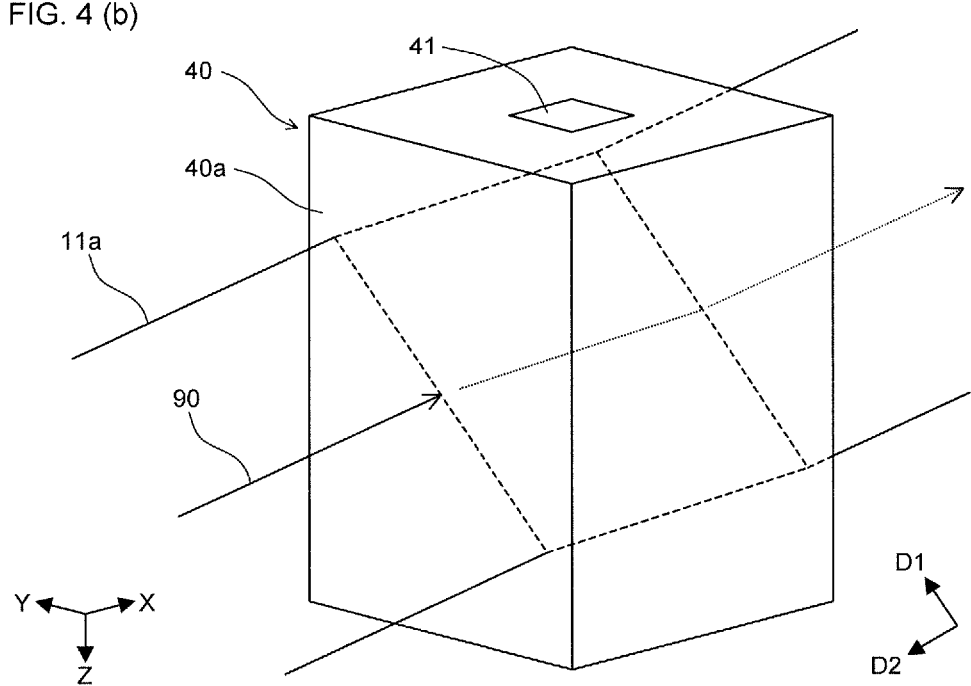

The state in which the sheet surface 11a of the light sheet 11 is perpendicular relative to the exterior side surface 40a is described in detail referring to FIGS. 4 (a) and (b).

In the first embodiment the optical axis of the irradiation optical system 30 is parallel to the X axis, and the exterior side surface 40a of the flow cell 40 is parallel to the Z plane. Therefore, the center axis 90 of the light impinging the exterior side surface 40a becomes perpendicular to the exterior side surface 40a, and the sheet surface a of the light sheet 11 becomes perpendicular relative to the exterior side surface 40a, as shown in FIG. 4 (a). In this case high precision images can be captured by the imaging element 60 since the thickness of the light sheet 11 in the second direction D2 is scarcely affected by the exterior side surface 40a, as described in reference to FIG. 3 (a).

However, the center axis 90 of the light impinging the exterior side surface 40a need not be perpendicular to the exterior side surface 40a if the sheet surface 11a of the light sheet 11 is perpendicular relative to the exterior side surface 40a. Specifically, the center axis 90 of FIG. 4 (a) also may be inclined in the first direction D1. Therefore, even though the center axis 90 of the light impinging the exterior side surface 40a is not perpendicular to the exterior side surface 40a, the sheet surface 11a of the light sheet 11 becomes perpendicular relative to the exterior side surface 40a, as shown in FIG. 4 (b). In this case also, high precision images can be captured by the imaging element 60 since the thickness of the light sheet 11 in the second direction D2 is scarcely affected by the exterior side surface 40a, as described in reference to FIG. 3 (c).

Returning to FIG. 1, the light collecting optical system 50 converges the fluorescent light given off from the cell 12 on the Y-axis positive side of the flow cell 40. The light collecting optical system 50 also converges the fluorescent light given off from the cell 12 on the Y-axis negative side of the flow cell 40. An objective lens 51 converges the fluorescent light given off from the cells 12. An optical filter 52 blocks unnecessary light, such as side scattered light, given off from the cells 12, and transmits only fluorescent light desired for imaging. When unnecessary light is not a problem, the optical filter 52 may be omitted. A collective lens 53 forms an image of the fluorescent light transmitted through the optical filter 52 on the imaging surface 61 of the imaging element 60. The collective lens 53 also may be omitted depending on the specifications of the objective lens 51.

The imaging element 60 receives the fluorescent light collected by the light collecting optical system 50 on the imaging surface 61. The imaging element 60 captures a 2-dimensional image of the fluorescent light, and outputs the captured 2-dimensional image. The captured 2-dimensional image is a cross sectional image of the cell 12. The imaging element 60 is configured by, for example, a color CCD (charge-coupled device). In the first embodiment, the imaging element 60 is configured to identify light of different wavelengths because fluorescent light of different wavelengths is given off from the nucleus 12a, HER2 gene and CEP17. Note that when a color CCD lacks the required sensitivity, the speed of the sample flowing through the flow cell 40 can be adjusted, such as reducing the speed adequately.

Imaging elements capable of identifying light of only a single wavelength or an imaging element configured by a color CCD also may receive the fluorescent light of each separated wavelength by separating the fluorescent light of each wavelength in the light collecting optical system 50. In this case the images captured with identical timing by the plurality of imaging elements can be mutually overlaid to produce a single cross sectional image. When fluorescent light of only a single wavelength is given off from the cell 12, the imaging element 60 may be configured to identify only the fluorescent light of the single wavelength.

In this case the optical axis of the light collecting optical system 50 is perpendicular to the Z axis direction that is the direction of the flow of the sample. In other words, the optical axis of the objective lens 51 is perpendicular to the Z axis. In this way the beam shape of the fluorescent light irradiating the imaging surface 61 is unlikely to collapse since the imaging element 60 receives the fluorescent light away from the exterior side surface of the flow cell 40 and the fluorescent light given off from the cell 12 is not refracted by the flow cell 40. Therefore, high precision images can be obtained by the imaging element 60.

The optical axis of the light collecting optical system 50 also may be shifted somewhat from the perpendicular state relative to the direction of the flow of the sample. If the optical axis of the light collecting optical system 50 is substantially perpendicular relative to the direction of the flow of the sample, collapse of the beam shape of the fluorescent light irradiating the imaging element 60 can be inhibited and high precision images can be captured by the imaging element 60.

The optical axis of the irradiation optical system 30 and the optical axis of the light collecting optical system 50 are mutually perpendicular. In this way the imaging element 60 can capture the fluorescent light given off from the cross sections of the cell 12 from the front side. That is, the imaging element 60 is not at a position shifted in the X-axis direction relative to the cross section of the cell 12, and the fluorescent light is captured in the YZ plane including the cross section of the cell 12. Therefore, a process for correcting the captured image in the X-axis direction becomes unnecessary.

The optical axis of the irradiation optical system 30 and the optical axis of the light collecting optical system 50 also may be shifted somewhat from the mutually perpendicular state. The If the optical axis of the irradiation optical system 30 and the optical axis of the light collecting optical system 50 are substantially perpendicular to each other, a process for correcting the captured image in the X-axis direction is largely unnecessary because the imaging element 60 captures the fluorescent light given off from the cross section of the cell 12 substantially from the front side.

The rotation control part 70 is connected to the rotation device 32, and controls the rotation of the rotation device 32.

The control performed by the rotation control part 70 is described below referring to FIGS. 8 (a) and (b).

The information processing device 10b includes a processing part 81, memory part 82, display part 83, input part 84, and interface 85. The processing part 81, for example, may be configured by a CPU. The memory part 82, for example, may be configured by a ROM, RAM, or hard disk. The processing part 81 controls each part in the information processing device 10b, and controls the imaging element 60 and rotation control part 70 through the interface 85. The processing part 81 generates a 3-dimensional image based on the images captured by the imaging element 60. Specifically, the imaging element 60 generates a 3-dimensional image by overlaying a plurality of cross sectional images obtained from a single cell. The display part 83 is a display for showing the processing results of the processing part 81 and the like. The input part 84 is a mouse and keyboard for receiving input instructions from an operator.

The particle imaging device 10 also may be configured from only the imaging part 10a. In this case the device may be arranged outside the particle imaging device 10 similar to the information processing device 10b. Images obtained by the imaging element 60 of the particle imaging device 10 are transmitted to the external device, and a 3-dimensional image is generated in the external device.

Positioning adjustment and correction of the aspect ratio when overlaying images obtained by the imaging element 60 are described below.

Figure 5:
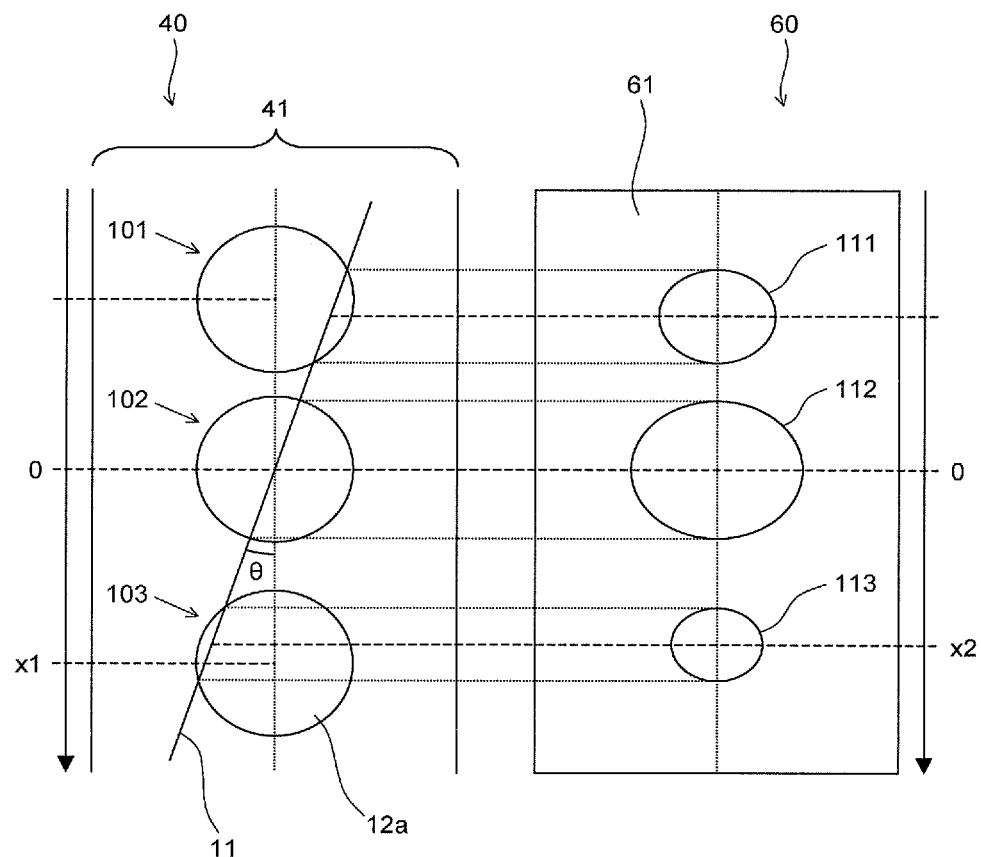
FIG. 5 illustrates position adjustment and aspect ratio correction when images obtained by the imaging element overlap in the first embodiment.

As shown in FIG. 5, the nucleus 12a within the cell 12 flows in the Z-axis positive direction through the flow path 41 of the flow cell 40. When the nucleus 12a passes through the light sheet 11, fluorescent light is given off from the cross section of the nucleus 12a irradiated by the light sheet 11, and the produced fluorescent light irradiates the imaging surface 61 of the imaging element 60. In FIG. 5 the nucleus 12a is illustrated as a sphere for convenience. When the nucleus 12a is sequentially positioned at positions 101 through 103 of the flow path 41, the fluorescent light given off from the nucleus 12a disposed at positions 101 through 103 respectively irradiates irradiation regions 111 through 113 on the imaging surface 61.

Since the light sheet 11 is inclined relative to the Z-axis direction, the length of the irradiation regions on the imaging surface 61 in the Z-axis direction is less than the length of the cross section irradiated by the light sheet 11 in the first direction D1. Specifically, the length of the irradiation regions on the imaging surface 61 in the Z-axis direction is the length of the cross section irradiated by the light sheet 11 in the first direction D1 multiplied by the cos θ. Therefore, the irradiation regions on the image can be corrected to a proper aspect ratio reflecting the actual cross section shape by multiplying the length of the irradiation region in the Z-axis direction by 1/cos θ.

When the nucleus 12a is at position 102, the light sheet 11 irradiates the center of the nucleus 12a. When the position of the nucleus 12a on the Z axis is designated 0, the position of the irradiation region on the Z axis also becomes 0. However, when the nucleus 12a is at another position than position 102, the light sheet 11 does not irradiate the center of the nucleus 12a. In this case the position of the nucleus 12a and the position of the irradiation region deviate.

When the position of the nucleus 12a at position 103 on the Z axis is designated x1, the position of the irradiation region 113 on the Z axis becomes x2. That is, the amount of movement of the nucleus 12a in the flow path 41 of the flow cell 40 is designated x1, and the amount of movement of the image of the nucleus 12a on the imaging surface 61 is designated x2. When the angle of inclination of the light sheet 11 relative to the direction of the sample flow is designated 0, x2 can be calculated by equation (1) below.

$$x2 = x1(1 - \sin 2\theta) \quad \text{(Eq. 1)}$$

Figure 6:
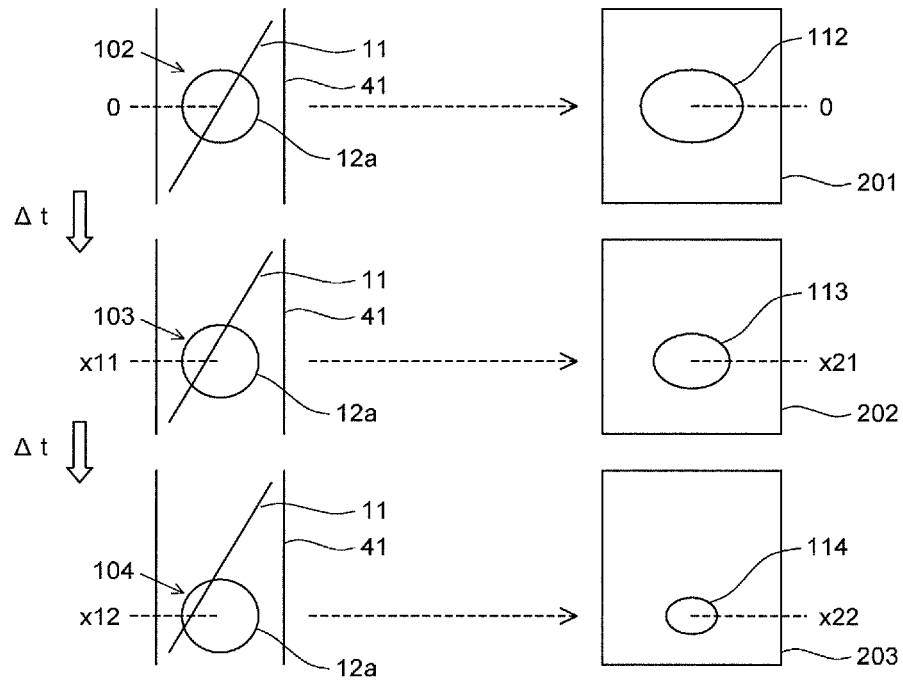
FIGS. 6 (a) and (b) illustrate position adjustment and aspect ratio correction when images obtained by the imaging element overlap in the first embodiment.
Figure 6:
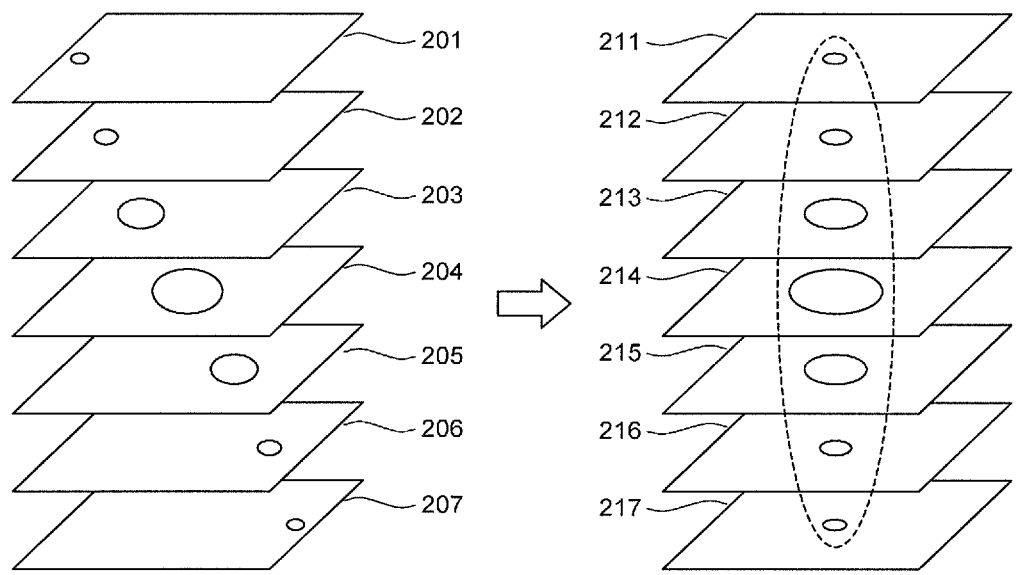

As shown in FIG. 6 (c), images 201 through 203 are acquired based on the nucleus 12a at positions 101, 102, and 103. Irradiation regions 112, through 114 corresponding to the nucleus 12a are respectively acquired in images 112 through 103.

When images 201 through 203 are overlaid, for example, the timing of acquiring the image 201 at position 0 of the irradiation region on the Z axis is set at a reference time. The amount of movement x11 of the nucleus 12a when has transited only an acquisition interval Δt from the reference time can be obtained by multiplying the sample flow speed by Δt. At this time the position x21 of the irradiation region 113 can be obtained by substituting x11 for x1 in equation (1). Similarly, the amount of movement x12 of the nucleus 12a when has transited only an acquisition interval 2Δt from the reference time can be obtained by multiplying the sample flow speed by 2Δt. At this time the position x22 of the irradiation region 114 can be obtained by substituting x12 for x1 in equation (1). Then, the irradiation region 113 is moved only x21 in the direction approaching position 0 on the Z axis in image 202. Similarly, the irradiation region 114 is moved only x22 in the direction approaching position 0 on the Z axis in image 203.

The images acquired by the imaging element 60 are sequentially stored in the memory part 82. The processing part 81 of the information processing device 10 groups all images from the first image to the last image of the acquired cross sections of a single nucleus 12a among the plurality of stored images. The image before the first image of the acquired cross section of the nucleus 12a and the image after the last image of the acquired cross section images of the nucleus 12a also may be included in the group of images. Note that the imaging interval of the imaging element 60 is set so that the number of images acquired from a single particle is approximately 2 to 100 images and determined by the thickness of the light sheet 11 in the second direction D2, the size of the particle, and the speed of the sample through the flow path 41.

For example, the processing part 81 groups images 201 through 207 as shown on the left side of FIG. 6 (b). The processing part 81 corrects the aspect ratio of the irradiation region on the image as mentioned above relative to the grouped images 201 through 207. Then the processing part 81 adjusts the position of the irradiation region on the image as mentioned above relative to the images 201 through 207 with the corrected aspect ratio above. In this way images 211 through 217 are obtained that have corrected aspect ratio and adjusted center position of the irradiation region as shown in the right side of FIG. 6 (b).

Then the processing part 81 generates a proper 3-dimensional image of a single nucleus 12a by overlaying the images 211 through 217 after aspect ratio correction and position adjustment.

Note that the HER2 gene and CEP17 also are included in the cross section images of the nucleus 12a because the fluorescent light given off from the HER2 gene and CEP17 are projected as bright spots within the irradiation region of the nucleus 12a. Aspect ratio correction and position adjustment are performed for the HER2 gene and CEP17 by means of the aspect ratio correction and position adjustment mentioned above. Accordingly, the bright spots of the HER2 gene and CEP17 are included in the 3-dimensional image of the nucleus 12a configured by overlaying the cross sectional images in the first embodiment. According to the first embodiment, in this way a 3-dimensional image can be obtained that reflects the distribution state in three dimensions based on a plurality of images acquired by the imaging element 60 not just for the parts of a predetermined size of the nucleus 12a, but also for small parts such as the HER2 gene and CEP17.

Aspect ratio correction and position adjustment used to produce a 3-dimensional image are not limited to the method described above. For example, the method described below also may be used.

A sample containing spherical particles such as fluorescent beads or the like flows through the flow cell 40, and an image is acquired by the imaging element 60. The center coordinates of the particle cross section in the direction of flow are obtained in the acquired image, and how much each image may be shifted to match the center coordinates of the cross section of the particle is calculated as the parameter of positional shift correction. In any one image how much the image may be expanded in the direction of flow to obtain a circular cross section of the particle is calculated as the parameter of aspect ratio correction. The two parameters obtained in this way are stored in the memory part 82.

When a 3-dimensional image is generated based on an actual sample, the processing part 81 performs position adjustment and aspect ratio correction of each image using the two parameters stored in the memory part 82. Then the processing part 81 generates a 3-dimensional image by overlaying each image that has been corrected and adjusted. Thus, a high precision 3-dimensional image can be produced by performing aspect ratio correction and position adjustment according to the actual conditions of the optical system of the particle imaging device 10. Note that although these two parameters may be obtained based on one bead, the parameters are preferably obtained by averaging the parameters obtained based on a plurality of beads.

The relationship between the inclination of the light sheet 11 and the imaging accuracy is described below.

Figure 7:
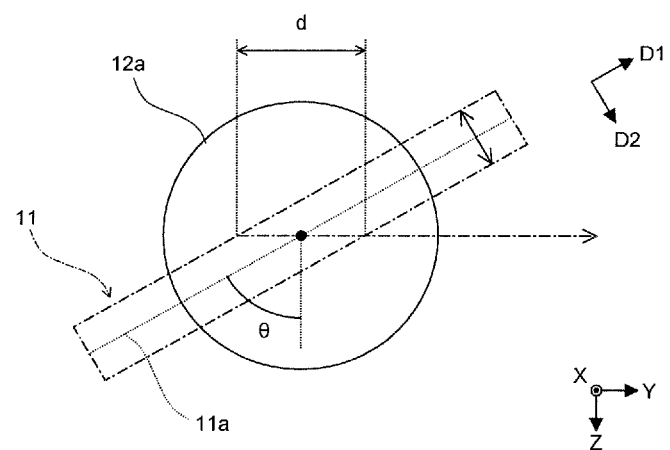
FIGS. 7 (a) and (b) illustrate the relationship between imaging precision and inclination of the light sheet in the first embodiment.
Figure 7:
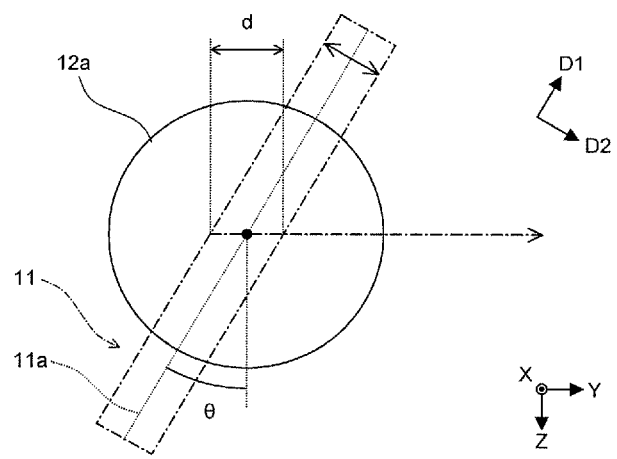

As shown in FIGS. 7 (a) and (b), the light sheet 11 has a predetermined thickness in the second D2 direction corresponding to the rotational position of the optical lens 31. When the light sheet 11 irradiates the center of the nucleus 12a, the thickness of the light sheet 11 in the optical axis direction of the light collecting optical system 50, that is, in the Y axis direction, is designated width d. In this case fluorescent light is given off from part of the nucleus 12a included in the range of the width d and not only the center of the nucleus 12a. Fluorescent light given off from the non-center part of the nucleus 12a therefore becomes noise when the center of the nucleus 12a is imaged. This noise component is preferably as small as possible since it becomes background noise of the acquired image.

The width d in this case increases as the inclination $\theta$ of the sheet surface 11a relative to the Z axis approaches 90 degrees, as shown in FIG. 7 (a). However, the width d in this case decreases as the inclination $\theta$ of the sheet surface 11a relative to the Z axis approaches 0 degrees, as shown in FIG. 7 (b). Accordingly, the angle $\theta$ is preferably smaller to reduce the noise component. However, the angle $\theta$ must be greater than 0 degrees since a plurality of different cross sectional images cannot be acquired when the angle $\theta$ becomes 0 degrees as discussed above.

The conditions of the angle $\theta$ that make it possible to acquire all cross sections while suppressing the noise component are described below.

Figure 8:
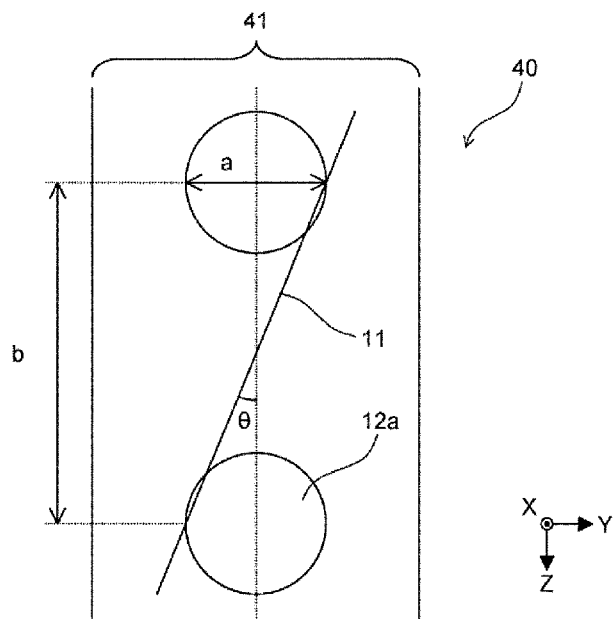
FIG. 8 (a) illustrates the conditions of the acquirable angles of the all cross section while suppressing the noise component in the first embodiment.
Figure 8:
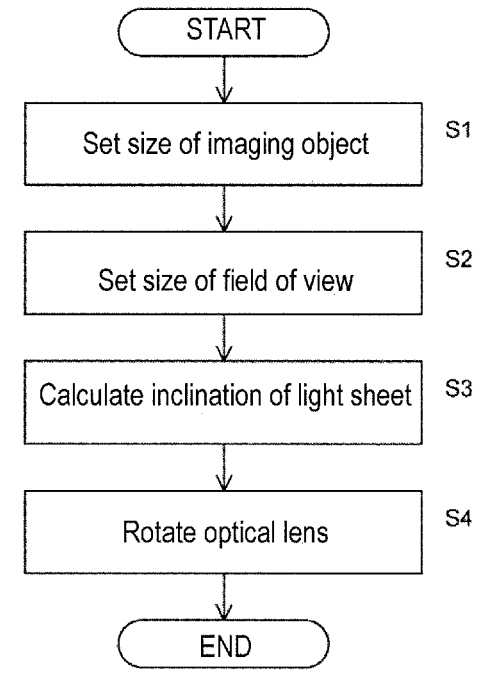

As shown in FIG. 8 (a), when the diameter of the nucleus 12a is designated 'a', the size of the imaging field of view in the flow path 41, that is, the width of the flow path 41 in the Z axis direction that can be imaged, is designated 'b'. Since all cross sections of the nucleus 12a are acquired when the angle $\theta$ is minimized to suppress the noise component, the light sheet 11 may be projected at one end of the nucleus 12a positioned on the top end of the imaging field of view and the other end of the nucleus 12a positioned at the bottom end of the imaging field of view. Therefore the optimum angle $\theta$ is calculated by equation (2) below.

$$\tan \theta = a/b \qquad \text{(Eq. 2)}$$

When angle $\theta$ is set so as to satisfy equation (2), high precision images in which background noise is suppressed can be imaged while acquiring all cross sectional images of the nucleus 12a.

The process of applying the optimum angle $\theta$ as described above to the particle imaging device 10 is described below.

As shown in FIG. 8 (b), in step S11 the processing part 81 receives a numerical value input by a user through the input part 84, and sets the received numerical value as the average size of the imaging target, that is, the average width of the imaging target in the optical axis direction of the light collecting optical system 50, in the rotation control part 70. In the first embodiment, the user inputs the average diameter of the nucleus 12a.

In step S1, the processing part 81 also may display a summary of the imaging target on the display part 83, and receive the imaging target selected by the user through the input part 84. In this case the processing part 81 reads the size corresponding to the imaging target received from the user from a correspondence table previously stored in the memory part 82, and sets the read size in the rotation control part 70. In step S1, the processing part 81 also may calculate the size of the imaging target based on the image acquired beforehand by the imaging element 60, and set the calculated size in the rotation control part 70.

In step S2, the processing part 81 receives the size of the field of view input by the user through the input part 84, and sets the input size of the field of view in the rotation control part 70. The size of the field of view changes according to the number of images acquired by the imaging element 60, magnification of the objective lens 51 of the light collecting optical system 50 and the like.

In step S2, the processing part 81 also may display a summary of the objective lens 51 and imaging element 60 on the display part 83, and receive the objective lens 51 and imaging element 60 selected by the user through the input part 84. In this case the processing part 81 also may read the magnification of the objective lens 51 and the number of pixels of the imaging element 60 received from the user from the correspondence table previously stored in the memory part 82, calculate the size of the field of view based on the read magnification and number of pixels, and set the calculated size of the field of view in the rotation control part 70.

In step S3, the rotation control part 70 substitutes the size of the field of view and size of the imaging target set by the processing part 81 in equation (2), and calculates the inclination angle $\theta$ of the light sheet 11. The processing part 81 also may calculate the inclination angle $\theta$ of the light sheet 11, and send the calculated angle $\theta$ to the rotation control part 70.

In step S4, the rotation control part 70 rotates the optical lens 31 through the rotation device 32 so that the inclination of the light sheet 11 becomes the angle $\theta$ calculated in step S3. In this way the inclination of the light sheet 11 is set so that all cross sectional images of the imaging target can be acquired as high precision images in which background noise is suppressed.

The rotation control part 70 is not necessarily required and may be omitted. In this case the operator, for example, manually rotates the rotation device 32 so that the angle of the optical lens 31 becomes 0 degrees. A plurality of holders to fixedly hold the optical lens 31 also may be provided in accordance with a plurality of angles of the optical lens 31 instead of the rotation device 32. In this case the angle of the optical lens 31 can be changed by selecting a holder that corresponds to the calculated angle θ and installing the selected holder within the device after the angle θ has been calculated. The installation of such a holder may be accomplished manually or automatically.

The process of generating a 3-dimensional image is described below.

Figure 9:
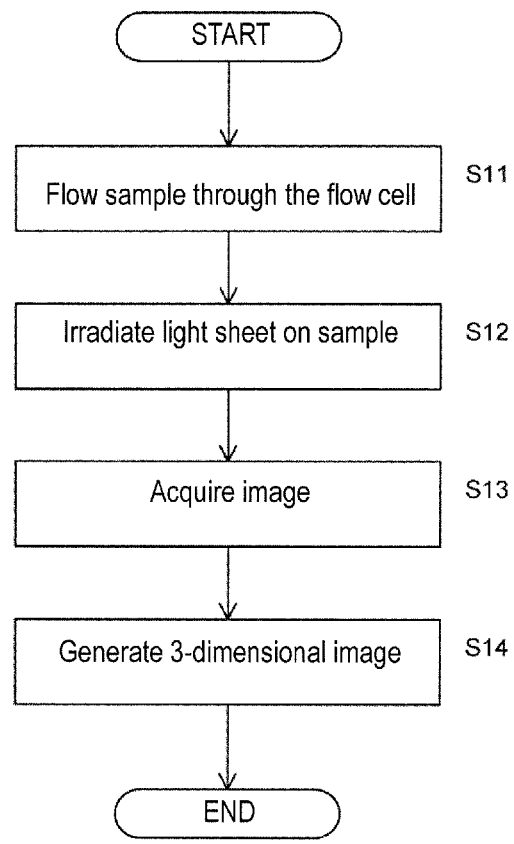
FIG. 9 is a flow chart showing the process of generating a 3-dimensional image in the first embodiment.

As shown in FIG. 9, the user flows the sample to the flow path 41 of the flow cell 40 in step S11. The imaging part 10a also may include a storage part for storing prepared sample, and a moving part for sending the sample stored in the storage part to the flow cell 40. In this case the processing part 81 controls the moving part of the particle imaging device 10 so as to flow the sample stored in the storage part to the flow cell 40 in step S11.

In step S12, the user irradiates the light sheet 11 on the sample by emitting light from the light source 20. The light source 20 also may be connected to the interface 85. In this case the processing part 81 irradiates the light sheet 11 on the sample by controlling the light source 20 in step S12.

In step S13, the processing part 81 acquires images of the fluorescent light given off from the nucleus 12a, HER2 gene and CEP17 within the cell 12 by the imaging element 60. Specifically, the images of the fluorescent light are continuously acquired based on the frame rate of the imaging element 60, and sequentially stored in the memory part 82. In step S14, the processing part 81 performs aspect ratio correction and positional adjustment, and then generates a 3-dimensional image based on the plurality of images acquired by the imaging element 60 as described referring to FIG. 5 and FIGs. 6 (a) and (b). That is, the processing part 81 calculates the amount of movement of the nucleus 12a on the imaging surface 61 based on equation (1) and performs aspect ratio correction for each of the plurality of acquired images of a single nucleus 12a. The processing part 81 then generates a 3-dimensional image of a single nucleus 12a based on the images having corrected aspect ratio and the calculated amount of movement.

Second Embodiment

As described above the distance between the objective lens 51 and the cross section of the nucleus 12a irradiated by the light sheet 11 differs according to the position on the cross section since the light sheet 11 is inclined relative to the direction of the sample flow. Specifically, the Z-axis negative side of the cross section is at a near position relative to the objective lens 51, and the Z-axis positive side of the cross section is at a distant position relative to the objective lens 51. In this case blurring of the part corresponding to the end part of the cross section occurs in the acquired image because the end part of the cross section irradiated by the light sheet 11 readily deviates from the depth of focus. In the second embodiment, the depth of focus is set so as to include the spread of the cross section in the optical axis direction of the light collecting optical system 50 in order to suppress this blurring.

Figure 10:
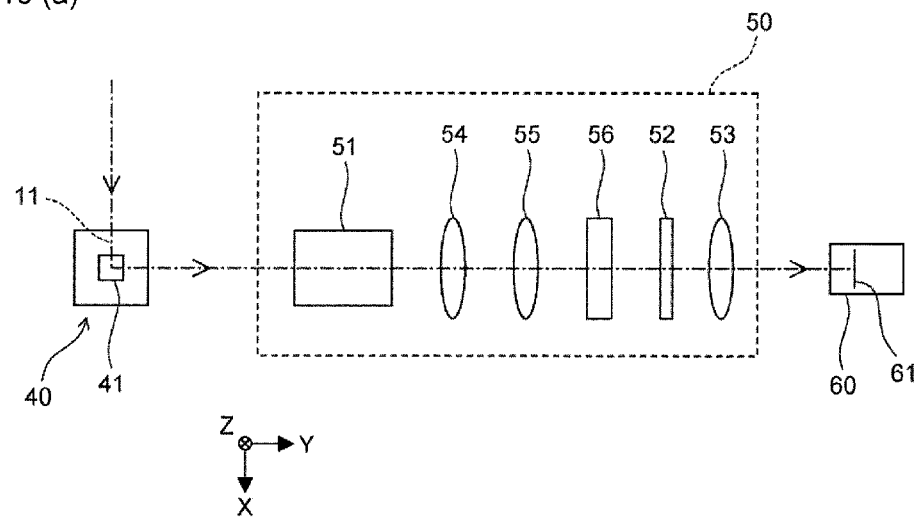
FIG. 10 (a) shows the structure of the light collecting optical system of a second embodiment.
Figure 10:
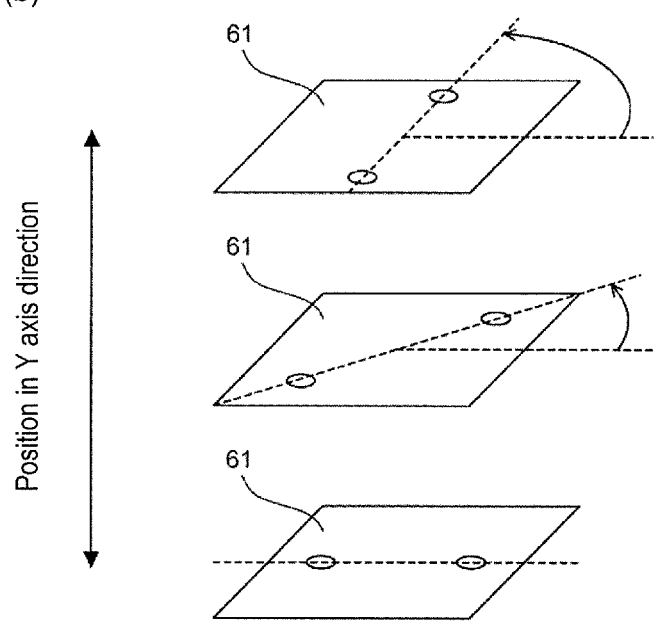

As shown in FIG. 10 (a), the light collecting optical system 50 of the second embodiment includes collective lenses 54 and 55, and a phase modulating element 56 provided between the objective lens 51 and collective lens 53 compared to the first embodiment. In other aspects the structure and control of the second embodiment are identical to those of the first embodiment.

The collective lenses 54 and 55 are arranged on the Y-axis positive side of the objective lens 51, and form a Fourier plane in the light collecting optical system 50. The Fourier plane also may be formed by installing an even number of lenses between the collective lens 55 and the phase modulating element 56. The phase modulating element 56 is arranged at the Fourier plane of the light collecting optical system 50, and realizes extended depth of focus (EDoF) by modulating the phase. The phase modulating element 56 forms a point spread function (PSF) to obtain the extended depth of focus. That is, the phase modulating element 56 has the effect of modulating the point spread function to allow extending the depth of focus. The phase modulating element 56 of the second embodiment forms the PSF to focus the fluorescent light given off from one point at two focal points. This PSF is referred to as a double-helix point spread function (DH-PSF).

As shown in FIG. 10 (b), the fluorescent light given off from different points of a position in the Y axis direction is focused at two focal points on the imaging surface 61 of the imaging element 60. At this time the two focal points are rotated on the imaging surface 61 in accordance with the position of the emission point of the fluorescent light in the Y axis direction. That is, the angle formed by the line connecting the two focal points and the reference line changes on the imaging surface 61 according to the position of the emission point of the fluorescent light in the Y axis direction. However, regarding the image of the emission point of the fluorescent light on the imaging surface 61, it is clear that blurring is unlikely to occur even though the position of the fluorescent light emission point changes to some extent in the Y axis direction. That is, the depth of field is enlarged and the range of focus is widened in the Y axis direction.

According to the second embodiment, part of the cell cross section is divided in two and rotated to focus on the imaging surface 61 in accordance with the position of each part in the Y axis direction through the effect of the phase modulating element 56. Therefore, the image acquired of the cross section is an image of two mutually overlaid and slightly shifted images based on the cross section. However, the two images are in a near blur free condition regardless of the position of the cross section on the Y axis direction as described referring to FIG. 10 (b). The amount of shifting of the two images is minimal. The image of each cross section therefore becomes an image of sharp images overlaid in a slightly shifted condition. Therefore, a clear cross section image is obtained whatever the position of the cross section in the Y axis direction. As a result, the 3-dimensional image obtained by overlaying the cross sectional images also is clear. Note that when the rotational shift of each part becomes a problem in the acquired image, the processing part 81 also may perform processing to correct the rotational shift of each part.

When the depth of focus is extended, the blurring of the acquired image is minimized by the inclination of the light sheet 11, and large particles such as the nucleus 12a of the cell 12 are clearly captured. When using a high magnification high NA objective lens 51, the depth of focus is narrowed. Also in this case larger particles can be clearly captured since the depth of focus is extended by the phase modulating element 56.

Note that the structure for extending the depth of focus is not limited to the structure described above. The phase modulating element 56 also may form a PSF other than DH-PSF. The depth of focus also may be extended by arranging a variable focus lens in the light collecting optical system 50. In the light collecting optical system 50, the optical path may branch at the last stage of the objective lens 51 and a lens may be arranged at different positions in the optical axis direction in each optical path of the light collecting optical system 50, to extend the depth of focus by focusing the fluorescent light passing through each lens at a different region on the imaging surface 61.

Third Embodiment

Figure 11:
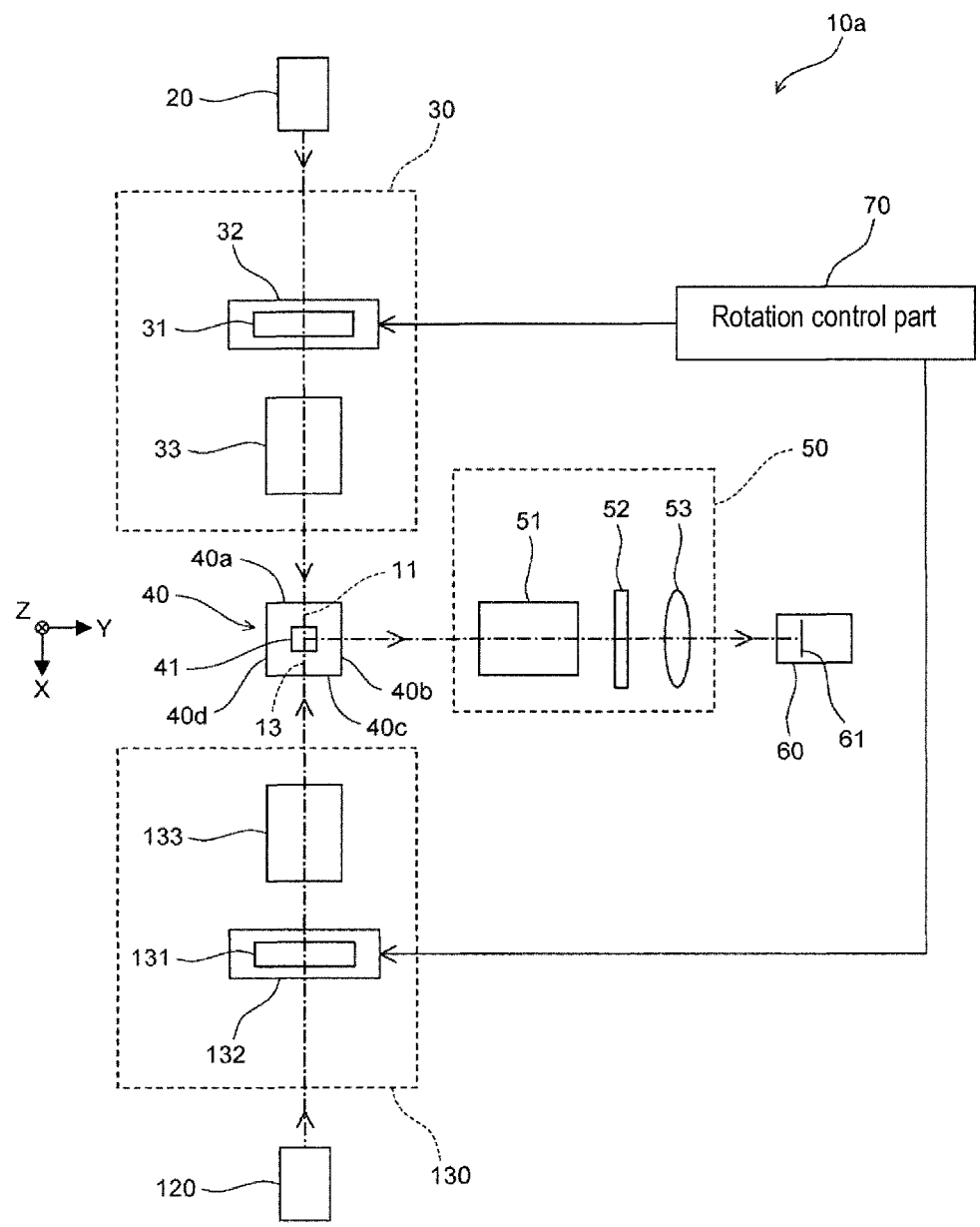
FIG. 11 shows the structure of the particle imaging device of a third embodiment.

As shown in FIG. 11, the imaging part 10a of the third embodiment is further provided with another light source 120 and another irradiation optical system 130 on the X-axis positive side of the flow cell 40 compared to the first embodiment. In other aspects the structure and control of the third embodiment are identical to those of the first embodiment.

The other light source 120 is configured identically to the light source 20, and emits light in the X-axis negative direction to irradiate light on the sample flowing through the flow cell 40. The other irradiation optical system 130 is configured identically to the irradiation optical system 30, and has an optical lens 131, rotation device 132, and objective lens 133. The optical axis of the other irradiation optical system 130 matches the optical axis of the irradiation optical system 30. The exterior side surface 40c that is impinged by light from the other irradiation optical system 130 is preferably a flat surface.

Figure 12:
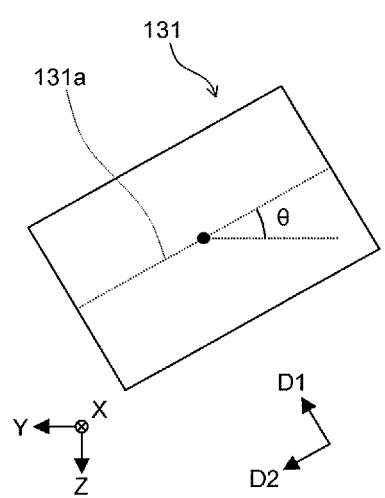
FIG. 12 (a) shows the optical lens of the third embodiment in the inclined state.
Figure 12:
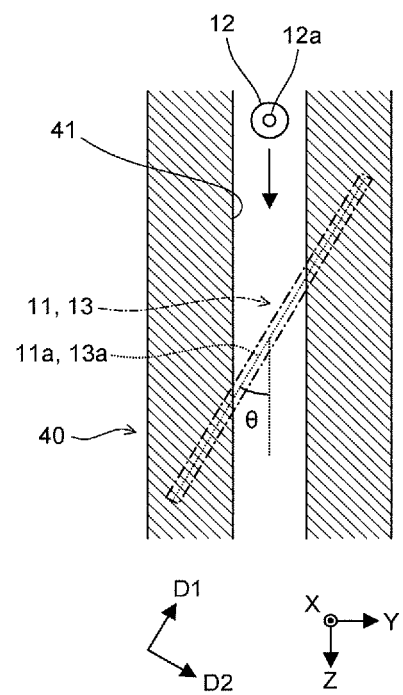
Figure 12:
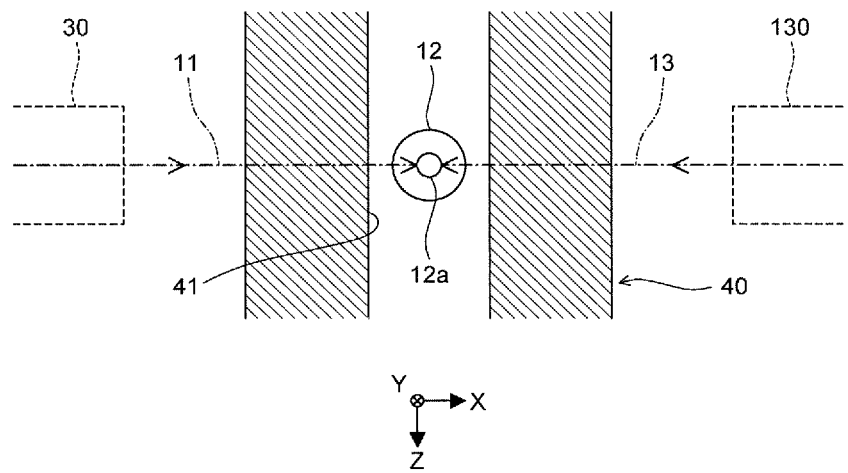

As shown in FIG. 12 (a), the optical lens 131 is rotated around the X axis by the rotation device 132 and is positioned at the rotation position where the angle relative to the generating line 131a relative to the Y axis is a predetermined angle θ. At this time the inclination direction of the optical lens 131 is identical to the inclination direction of the optical lens 31. The other irradiation optical system 130 forms another light sheet 13 on the flow cell 40 from the light emitted from the other light source 120. The rotation control part 70 is connected to the rotation device 132, and controls the rotation of the rotation device 132. The rotation device 132 also may be controlled by a rotation control part separate from the rotation control part 70.

As shown in FIG. 12 (b), the sheet surface 13a of the other light sheet 13 is overlaid with the sheet surface 11a of the light sheet 11 in the flow path 41 of the flow cell 40. In this way the cell 12 flowing through the flow path 41 is irradiated by the light sheet 11 from the X-axis positive direction, and irradiated by the other light sheet 13 from the X-axis negative direction. Note that even though the optical axis of the other irradiation optical system 130 is shifted from the perpendicular state relative to the direction of sample flow, the sheet surface 13a of the other light sheet 13 is perpendicular relative to the exterior side surface 40c of the flow cell 40 that is impinged by the light emitted from the other light source 120.

When the light sheet 11 and the other light sheet 13 irradiate the same position of the flow cell 40 from mutually different directions in this way, bleeding and uneven irradiation of light irradiating the cell 12 can be suppressed. For example, when the light sheet 11 irradiates the cell 12 from only the X-axis positive direction as in the first embodiment, light within the cell 12 is dispersed as the distance increases from the irradiation optical system 30, and produces bleeding and uneven irradiation of the light irradiating the cell 12. In this case, for example, the X-axis negative side is becomes bright and the X-axis positive side becomes dark in the images of the nucleus 12a acquired by the imaging element 60.

However, bleeding and uneven irradiation of the light irradiating the cell 12 can be suppressed in the third embodiment since the cell 12 is irradiated at the same position by light sheets from the X-axis positive side and the X-axis negative side: In this way the precision of the image acquired by the imaging element 60 is improved and a high precision 3-dimensional image can be generated.

Fourth Embodiment

Figure 13:
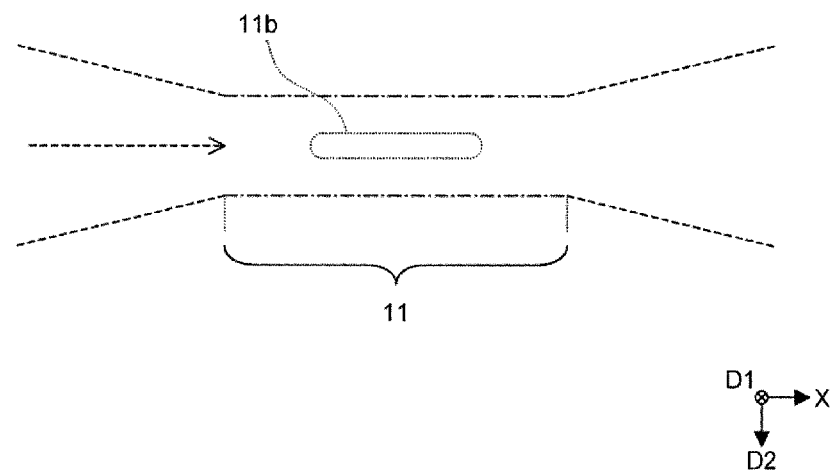
FIG. 13 (a) is a schematic view showing the area in which two-photon excitation is possible in a fourth embodiment.
Figure 13:
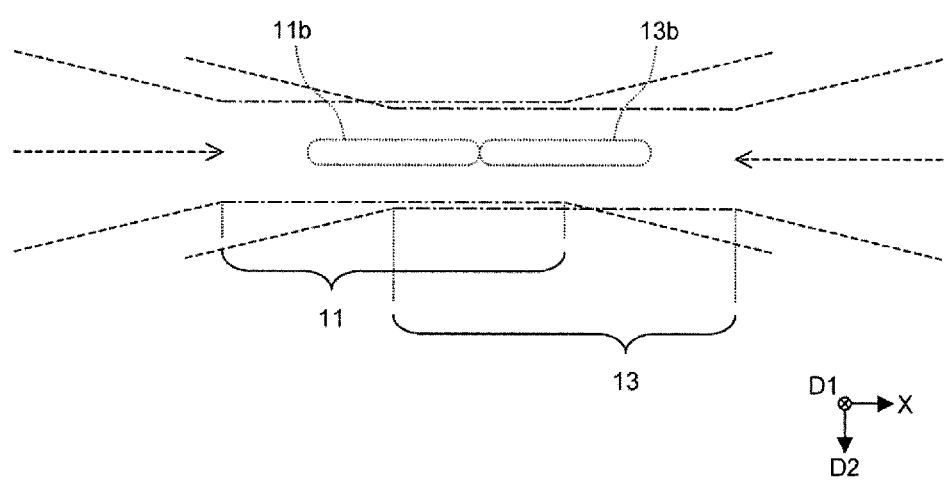

In the fourth embodiment the light source 20 is a semiconductor laser light source that emits pulsed high power laser light compared to the first embodiment. When the light sheet 11 is formed based on high power laser light, a region 11b is formed that makes possible increased photon density and two-photon excitation in the light sheet 11 as shown in FIG. 13 (a). The length of the region 11b in the second direction D2 and X-axis direction is less than the length of the light sheet 11. The length of the region 11b and the length of the light sheet 11 are substantially the same in the first direction D1.

When the fluorescent stained part of the cell 12 passes through the region 11b, fluorescent light is given off from the fluorescent dye through two-photon excitation. In the fourth embodiment, the wavelength of the laser light emitted from the light source 20 is preferably in the wavelength band of near infrared light so as to produce fluorescent light of the same wavelength as in the first embodiment when two-photon excitation occurs. Other wavelength bands also may be used such as that of visible light depending on the particles to be imaged. Note that unneeded fluorescent light may be produced when the fluorescent stained part of the cell 12 passes through the part of the light sheet 11 that is outside the region 11b. The wavelength of this unneeded fluorescent light in this case is in the wavelength band of near infrared light. In the fourth embodiment, a filter to block the unneeded fluorescent light is therefore arranged in the front stage of the imaging element 60. Alternatively, the unneeded fluorescent light also may be blocked by the optical filter 52. In other aspects the structure and control of the fourth embodiment are identical to those of the first embodiment.

According to the fourth embodiment, the fluorescent light given off from the nucleus 12a in a narrow range in the optical axis direction of the light collecting optical system 50 can be imaged because the region 11b in which two-photon excitation occurs is narrow in the second direction D2. That is, images of cross sections can be more selectively acquired. In this way high precision images can be obtained.

As described above, the length in the X axis direction of the region 11b in which two-photon excitation occurs is less than the length of the light sheet 11 in the X axis direction. Therefore, it is preferable the flow cell 40 is irradiated by the light sheet 11 and other light sheet 13 as in the third embodiment in order to acquire cross sectional images that are long in the X axis direction. In this case the other light source 20 is configured identically to the light source 20 of the fourth embodiment. A region 13b in which two-photon excitation is possible may be formed even in the other light sheet 13 in this way. As shown in FIG. 13 (b), the region 11b of possible two-photon excitation in the light sheet 11 and region 13b of possible two-photon excitation in the other light sheet 13 may be positioned at shifted positions in the X axis direction. Thus, cross sectional images can be acquired that are long in the X axis direction since the regions of possible two-photon excitation can be lengthened in the X axis direction compared to the case of FIG. 13 (a).

Note that the light source 20 also may be a so-called CW laser that emits continuous laser light, if the photon density is increased so as to produce two-photon excitation in the light sheet 11. Fluorescent light generation is not limited to being produced by two-photon excitation, inasmuch as fluorescent light also may be produced by multi-photon excitation.

Fifth Embodiment

In the fifth embodiment the position of the other light source 20 and the position of the other irradiation optical system 130 are shifted in the Z axis direction compared to the third embodiment. In other aspects the structure and control of the fifth embodiment are identical to those of the third embodiment.

Figure 14:
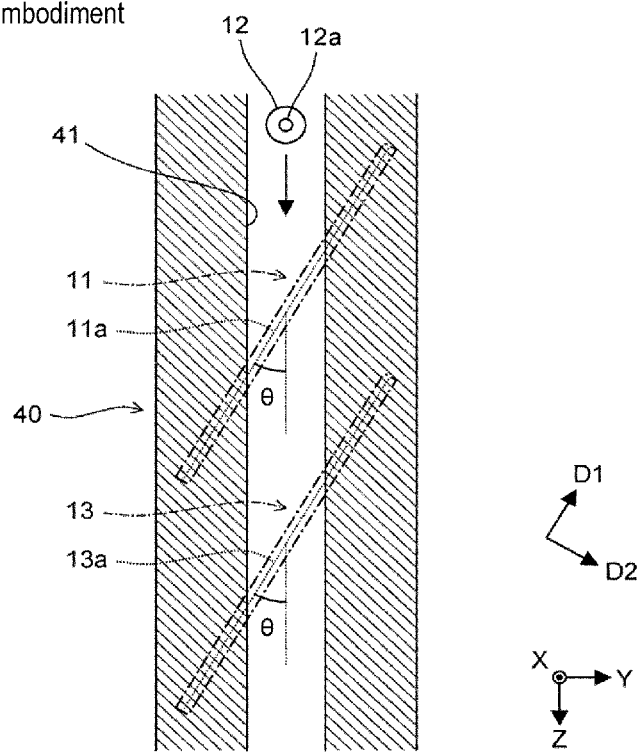
FIG. 14 (a) is a schematic view of the cross section of the light sheet flow path and flow cell of a fifth embodiment when viewed in the X-axis negative direction.
Figure 14:
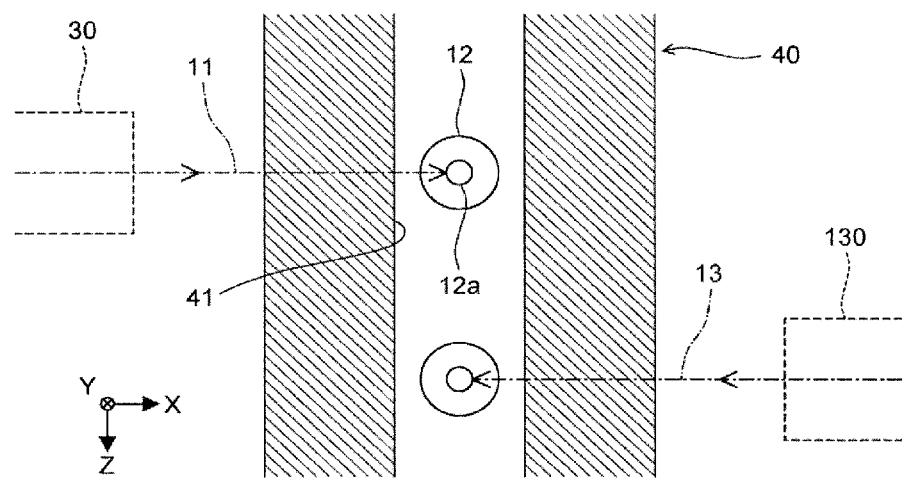

As shown in FIG. 14 (a), the light sheet 11 and the other light sheet 13 are separated in the Z axis direction in the flow path 41 of the flow cell 40 by shifting the position of the other light source 20 and the position of the other irradiation optical system 130 in the Z axis direction. At this time the sheet surface 11a of the light sheet 11 and the sheet surface 13a of the other light sheet 13 are parallel.

As shown in FIG. 14 (b), the light sheet 11 irradiates the X-axis b=negative side of the cell 12, and the other light sheet 13 irradiates the X-axis positive side of the cell 12. The optical axis of the irradiation optical system 30 and the optical axis of the other irradiation optical system 130 also are shifted in the Z axis direction. The image of the nucleus 12a acquired based on the light sheet 11 and the image of the nucleus 12a acquired based on the other light sheet 13 therefore both reflect the bleeding and uneven irradiation in the light irradiating the cell 12. In the third embodiment, however, image of the nucleus 12a acquired based on the light sheet 11 and the image of the nucleus 12a acquired based on the other light sheet 13 are overlaid by the processing part 81. In this way a single cross sectional image can be acquired identical to the third embodiment. High precision 3-dimensional images therefore can also be produced in the fifth embodiment.

According to the fifth embodiment, a plurality of cross sectional images can be acquired simultaneously based on the light sheet 11 and other light sheet 13. In this way the speed of the sample flow can be increased since the exposure time during which the nucleus 12a is irradiated by the light sheet 11 and other light sheet 13 is respectively shorter compared to when a single cross sectional image is acquired based on a single light sheet 11 as in the first embodiment. According to the fifth embodiment, cross sectional images thus can be acquired and a 3-dimensional image generated more rapidly compared to the first embodiment. Note that although two light sheets irradiate the flow cell 40 from different sides in the fifth embodiment, the invention is not limited to this arrangement, and the flow cell 40 also may be irradiated from the same side.

Figure 15:
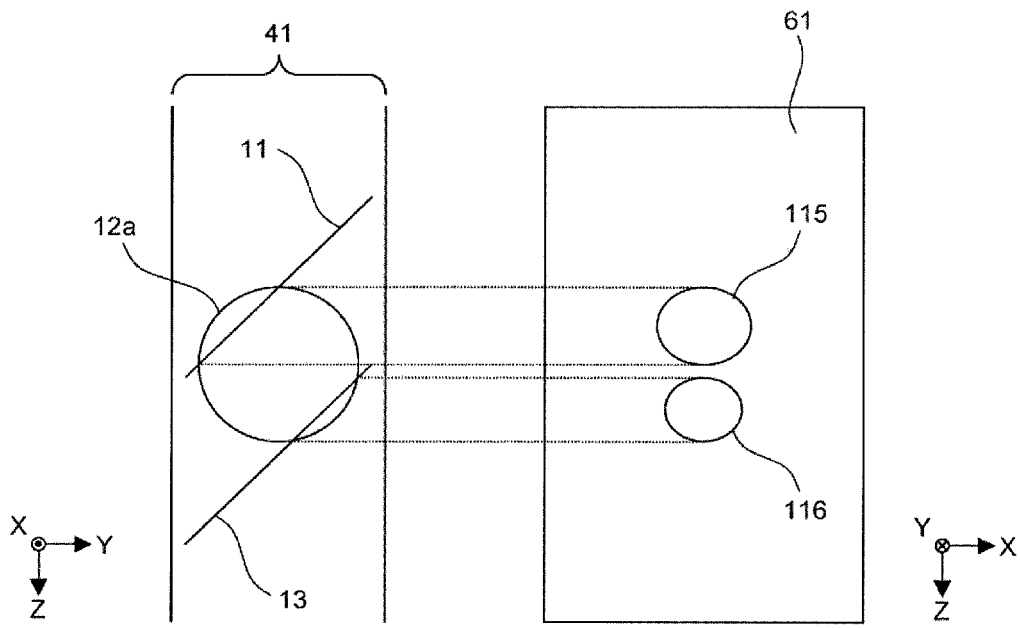
FIGS. 15 (a) and (b) illustrate the necessity of sufficient separation of the light sheet and the other light sheet of the fifth embodiment in the sample flow direction.
Figure 15:
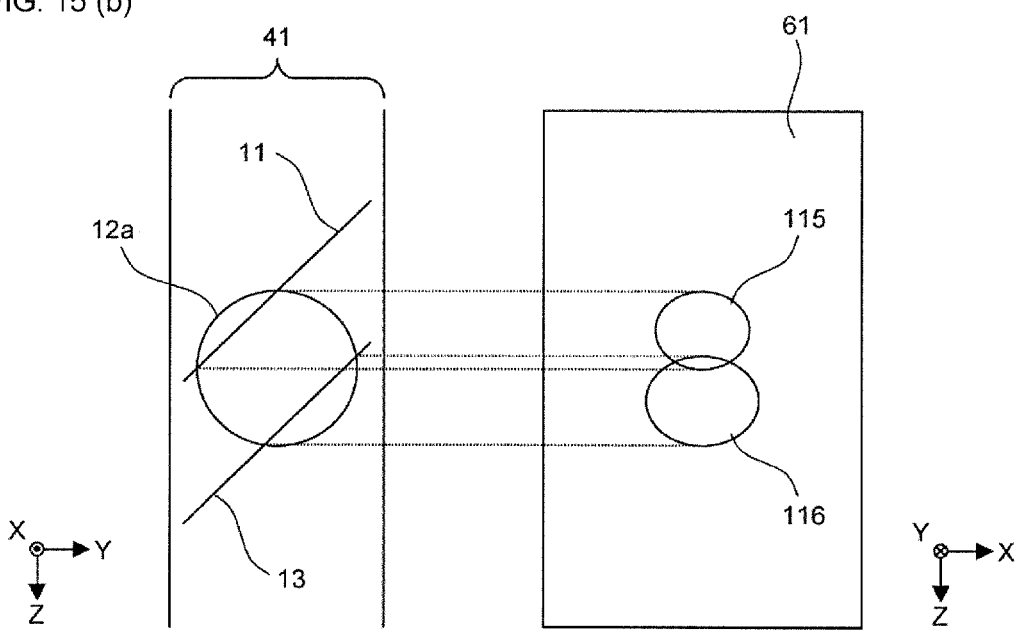

In this case the light sheet 11 and the other light sheet 13 must be adequately separated in the sample flow direction in the flow path 41. For example, in the case shown in FIG. 15 (a), irradiation region 115 on the imaging surface 61 based on the light sheet 11, and irradiation region 116 on the imaging surface 61 based on the other light sheet 13 are mutually separated. In this case the image based on irradiation region 115 and the image based on irradiation region 116 can be recognized as different cross sectional images. In the case shown in FIG. 15 (b), however, the irradiation region 115 and irradiation region 116 mutually overlap since the light sheet 11 and the other light sheet 13 are close. In this case the image based on irradiation region 115 and the image based on irradiation region 116 cannot be recognized as different cross sectional images.

Accordingly, the positions of the light source 20 and the other irradiation optical system 130 are determined in the Z axis direction so that the light sheet 11 and the other light sheet 13 are sufficiently separated in the sample flow direction in the flow path 41.

Sixth Embodiment

Figure 16:
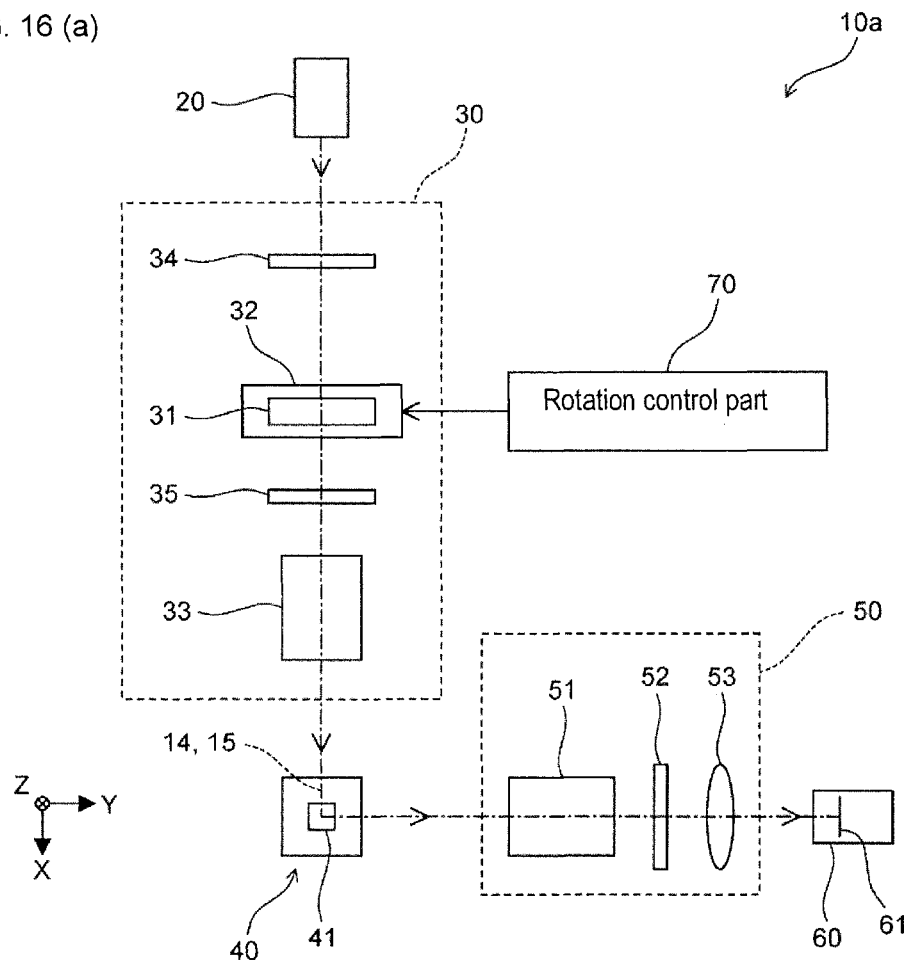
FIG. 16 (a) shows the structure of the particle imaging device of a sixth embodiment.
Figure 16:
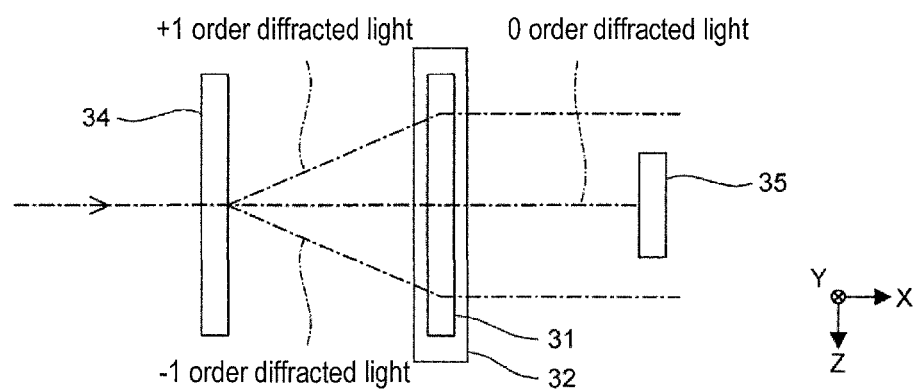

As shown in FIG. 16 (a), the irradiation optical system 30 is further provided with an optical element 34 and beam stopped 35 in the sixth embodiment compared to the first embodiment. In other aspects the structure and control of the sixth embodiment are identical to those of the first embodiment.

The optical element 34 irradiates the flow cell 40 when the light sheet is in a divided state in the direction of sample flow by dividing the light emitted from the light source 20. Specifically, the optical element 34 is a diffraction grating that divides the light emitted from the light source 20 into 0 order diffracted light, +1 order diffracted light, and −1 order diffracted light, as shown in FIG. 16 (b). The center axes of the +1 order diffracted light and −1 order diffracted light are inclined from the X axis direction on the Z-axis negative side and Z-axis positive side, respectively. The optical lens 31 converges the respective three diffracted lights divided by the optical element 34 identically to the first embodiment.

The beam stopper 35 blocks only the 0 order diffracted light as shown in FIG. 16 (b). The _+1 order diffracted light and the −1 order diffracted light that pass the position of the beam stopper 35 are converged by the objective lens 33 identically to the first embodiment, to form flat beams on the flow path 41 of the flow cell 40. That is, the irradiation optical system 30 forms a light sheets 14 and 15 on the flow cell 40 from the light emitted from the light source 20.

Figure 17:
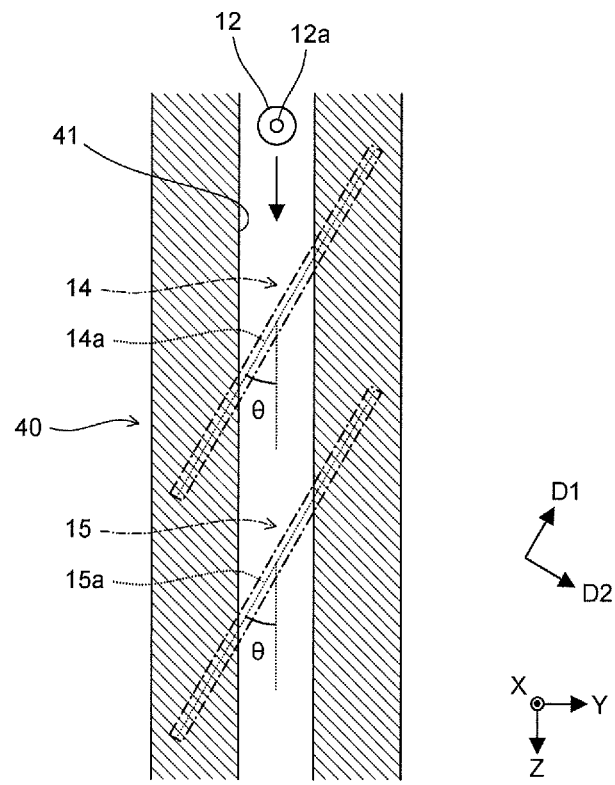
FIG. 17 (a) is a schematic view of the cross section of the light sheet flow path and flow cell of the sixth embodiment when viewed in the X-axis negative direction.
Figure 17:
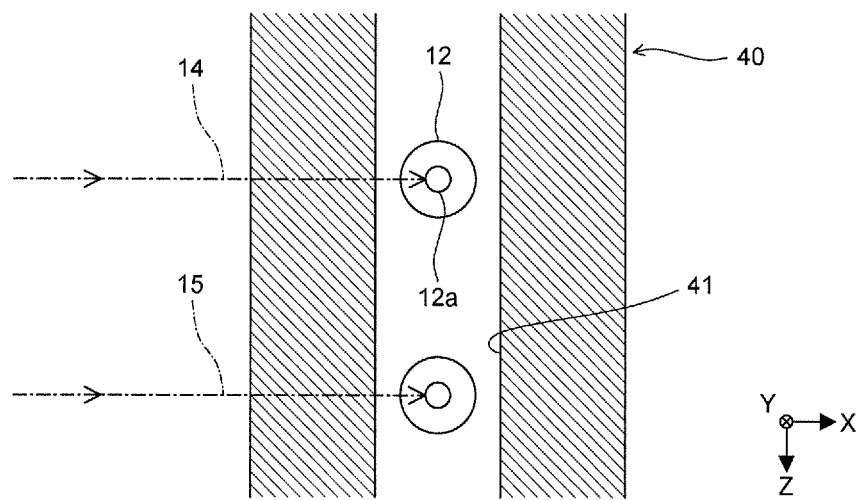

As shown in FIG. 17 (a), the light sheet 14 based on the +1 order diffracted light, and the light sheet 15 based on the −1 order diffracted light are separated in the Z axis direction in the flow path 41 of the flow cell 40. At this time the sheet surface 14a of the light sheet 14 and the sheet surface 15a of the light sheet 15 are parallel.

As shown in FIG. 17 (b), the light sheets 14 and 15 both irradiate the cell 12 on the X-axis negative side. In this way a plurality of cross sectional images are simultaneously acquired based on the two light sheets 14 and 15. Thus, the speed of the sample flow can be increased since the exposure time during which the nucleus 12a is irradiated by the light sheets 14 and 15 is respectively shorter compared to when a single cross sectional image is acquired based on a single light sheet 11 as in the first embodiment. According to the sixth embodiment, cross sectional images thus can be acquired and a 3-dimensional image generated more rapidly compared to the first embodiment.

In the sixth embodiment, the light sheets 14 and 15 also are adequately separated in the direction of sample flow so that the cross sectional images can be separated based on the light sheets 14 and 15. The spacing of the light sheets 14 and 15 is determined by the diffraction angle of the optical element 34.

The 0 order diffracted light also may be dimmed by arranging an ND filter in place of the beam stopper 35. In this way three light sheets based on the +1, 0, and −1 order diffracted light can irradiate the flow path 41 of the flow cell 40. In this case the intensities of the +1, 0, and −1 order diffracted light can be substantially the same and the intensities of the three light sheets can be substantially the same by adjusting the transmittance of the ND filter. Further, the invention is not limited to only+1, −1 order diffracted light inasmuch as four light sheets also may be formed based on +2, +1, −1, −2 order diffracted light.

Seventh Embodiment

Figure 18:
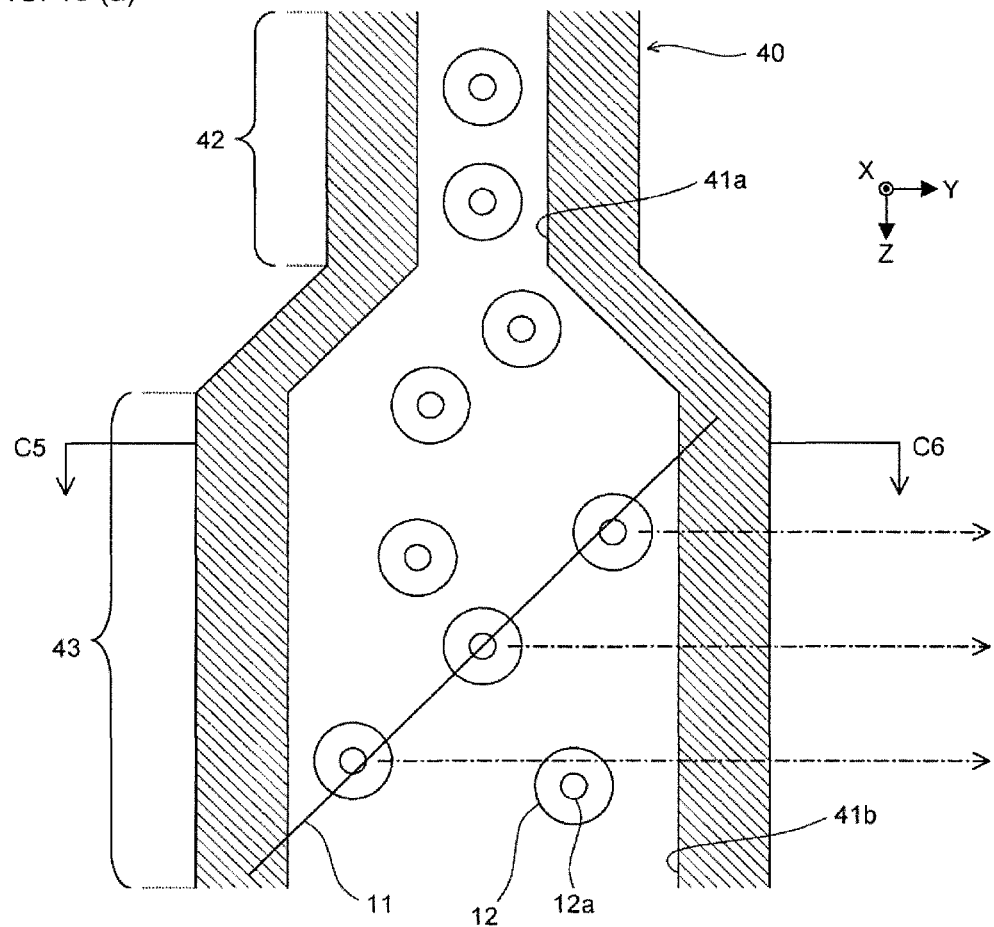
FIG. 18 (a) is a schematic view of the flow cell of a seventh embodiment when viewed in the X-axis negative direction.
Figure 18:
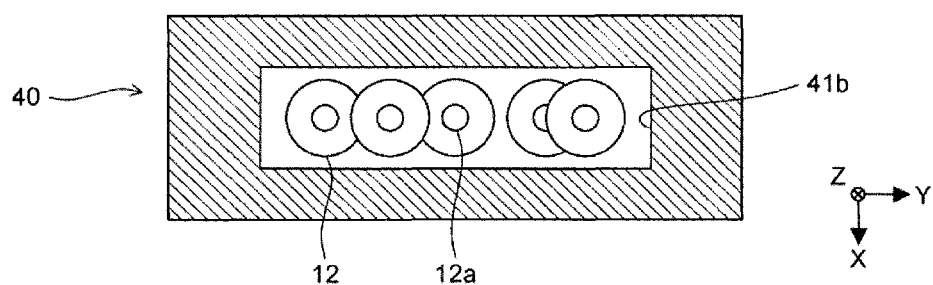

In the seventh embodiment, the flow cell 40 is configured by a first region 42 and a second region 43 continuous in the Z axis direction, as shown in FIG. 18 (a), compared to the first embodiment. In other aspects the structure and control of the second embodiment are identical to those of the first embodiment.

The first region 42 has a flow path 41a, and the second region 43 has a flow path 41b. The width in the X axis direction and the width in the Y axis direction of the flow path 41a are identical to those of the flow path 41 of the first embodiment. The width in the Y axis direction of the flow path 41b is larger than the width in the Y axis direction of the flow path 41a. The light sheet 11 irradiates the flow cell 40 so as to cover the flow path 41b from the end part on the Y-axis negative side to the end part on the Y-axis positive side. When the cross section C5-C6 shown in FIG. 18 (a) is viewed in the Z-axis positive direction, the cross section is as shown in FIG. 18 (b). The width in the X axis direction of the flow path 41b is the same as the flow path 41 of the first embodiment, as shown in FIG. 18 (b).

Thus, the flow cell 40 is configured so that the width in the direction of the optical axis of the light collecting optical system 50, that is, the width in the Y axis direction is larger than the width in the direction of the optical axis of the irradiation optical system 30, that is, the width in the X axis direction, in the region irradiated by the light sheet 11. In this way a plurality of cells 12 can simultaneously pass through the single light sheet 11. According to the seventh embodiment, cross sectional images of a plurality of nuclei 12a therefore can be acquired in parallel, and 3-dimensional images of a plurality of nuclei can be acquired in parallel.

Although the light imaged by the imaging element 60 is fluorescent light in the first through seventh embodiments, the light imaged by the imaging element 60 also may be light given off from particles being imaged in a lateral direction of the flow cell 40, for example, side scattered light.

Although the flow cell 40 has an exterior square shape viewed in the Z axis direction in the first through seventh embodiment, the flow cell 40 also may have a circular exterior shape viewed in the Z axis direction. For example, when the flow cell 40 is configured in a columnar shape, the flow cell 40 has a circular exterior shape and the exterior surface of the flow cell 40 is a curved surface. When the flow cell 40 is configured in a columnar shape, the light sheet is perpendicular to the tangent plane of the exterior surface. In this way the shape of the light sheet irradiating the cell 12 is unlikely to collapse since refraction of the light sheet impinging the flow cell 40 by the exterior side surface is suppressed. Therefore, high precision images can be obtained by the imaging element 60.

Although the sample flows in the Z axis direction relative to the flow cell 40 installed in the device in the first through seventh embodiments, the sample also may be fixed within the flow cell 40 by a gel or the like and the flow cell 40 moved in the Z axis direction. In this case when the flow cell 40 is moved in the Z axis direction, fluorescent light given off from the cross section irradiated by the light sheet can be imaged by the imaging element 60 since the particles contained in the sample traverse the light sheet. Accordingly, high precision images can be acquired by the imaging element 60, and high precision 3-dimensional images of the particles can be generated the same as in the first through seventh embodiment.

What is claimed is:

1. A particle imaging device comprising:
a flow cell configured to flow a sample containing particles;
a light source to emit a beam of light;
an irradiation optical system configured to form a light sheet on the flow cell, wherein the irradiating optical system comprises:
a cylindrical lens configured to converge the beam of light to form the light sheet having a flat sheet surface regulated by a first direction D1 with a width in a second direction D2, wherein the second direction D2 is orthogonal to the first direction D1, and the cylindrical lens being rotated about an optical axis of the beam of light in order to incline the light sheet at a predetermined angle; and
an objective lens configured to converge the inclined light sheet from the cylindrical lens to form parallel light in the first direction D1, and directing the inclined light sheet to the flow cell;
a light collecting optical system configured to collect the light given off from the particles when passing across the inclined light sheet;
an imaging element configured to receive the light collected by the light collecting optical system;
wherein the flat sheet surface of the inclined light sheet is substantially perpendicular to an exterior side surface of the flow cell to which the light is entered from the irradiation optical system;
wherein an optical axis of the light collecting optical system is angled with respect to an optical axis of the beam of light from the irradiation optical system at a location where the beam of light impinges the exterior side surface of the flow cell, and the flat sheet surface of the inclined light sheet is not perpendicular to a flow direction of the sample so that the imaging element obtains a plurality of different two-dimensional cross sectional images of the respective particles sequentially obtained over an interval of time as they pass through the flat sheet surface of the inclined light sheet.

2. The particle imaging device of claim 1, wherein
the optical axis of the light collecting optical system is perpendicular to the flow direction of the sample.

3. The particle imaging device of claim 1, wherein the irradiating optical system comprises:
a rotation device configured to rotate the cylindrical lens around the optical axis of the irradiating optical system in order to incline the sheet surface of the light sheet at the predetermined angle.

4. The particle imaging device of claim 1, further comprising:

a processing part configured to generate a 3-dimensional image of a particle based on overlaying the plurality of two-dimensional cross sectional images of the particle sequentially obtained over the interval of time by the imaging element.

5. The particle imaging device of claim 4, wherein the processing part is configured to:
calculate an amount of movement of the plurality of two-dimensional cross sectional images of the particle on an imaging surface of the imaging element based on at least the amount of movement of the particle in the flow cell and the angle of the light sheet in the flow direction of the sample; and
generate the 3-dimensional image of a single particle based on the plurality of two-dimensional cross sectional images sequentially obtained by the imaging element relative to the single particle.

6. The particle imaging device of claim 4, wherein the processing part is configured to correct a particle size of at least one of the plurality of two-dimensional cross sectional images obtained by the imaging element based on the predetermined angle.

7. The particle imaging device of claim 1, wherein the light collecting optical system further comprises a structure for enlarging a depth of field;
the imaging element receives light transmitted through the structure for enlarging the depth of field.

8. The particle imaging device of claim 7, wherein the structure configured to enlarge the depth of field includes a phase modulating element having an effect of modulating a point spread function.

9. The particle imaging device of claim 1, further comprising:
another light source; and
another irradiation optical system configured to form another inclined light sheet on the flow cell from the light emitted from this other light source;
wherein another flat sheet surface of the another inclined light sheet is perpendicular to the exterior side surface of the flow cell to which the light is entered from this another light source; and
the flat sheet surface of the inclined light sheet is parallel to the another flat sheet surface of the another inclined light sheet.

10. The particle imaging device of claim 9, wherein the inclined light sheet and the another light sheet irradiate the flow cell from two mutually different directions.

11. The particle imaging device of claim 9, wherein the inclined light sheet and the another light sheet overlap each other at a flow path of the flow cell.

12. The particle imaging device of claim 9, wherein the inclined light sheet and the another light sheet are separated from each other in the flow direction of the sample at a flow path of the flow cell.

13. The particle imaging device of claim 1, wherein the irradiation optical system further comprises
an optical element configured to irradiate the flow cell over a time interval so that inclined light sheets are sequentially formed in a state of separation in the flow direction of the sample.

14. The particle imaging device of claim 1, wherein the flow cell is configured to include a first region and a second region having two different widths in a same direction which is perpendicular to a flow path, so that a plurality of particles in the flow path first pass through the first region having a first width w1 followed by a second region having a second width w2, wherein the second width w2 is greater than the first width w1, and wherein the second region is, at least in part, irradiated by the inclined light sheet, and
wherein, in the second region that is irradiated by the inclined light sheet, a third width w3 of a flow path cross section in the direction of the optical axis of the light collecting optical system is greater than a fourth width w4 of the flow path cross section in the direction of the optical axis of the irradiation optical system, in order that the plurality of particles can pass through the inclined light sheet for simultaneous cross-sectional images acquisition.

15. A particle imaging method comprising:
forming, in a flow cell, a flow of a sample containing particles;
forming an inclined light sheet on the flow cell, wherein a flat sheet surface of the inclined light sheet is substantially perpendicular to an exterior side surface of the flow cell in a first direction D1 and the flat sheet surface of the light sheet is inclined at a predetermined angle that is not perpendicular to a flow direction of the sample;
obtaining a plurality of different two-dimensional cross sectional images of the respective particles passing through the flat sheet surface of the inclined light sheet sequentially over an interval of time,
wherein forming the inclined light sheet further comprises:
emitting a beam of light from a light source;
converging the beam of light in the first direction D1 with a cylindrical lens configured to converge the beam of light to form a light sheet having a flat sheet surface regulated by the first direction D1 with a width in a second direction D2 that is sufficiently small relative to the particles, wherein the second direction D2 is orthogonal to the first direction D1, and the cylindrical lens being rotated about an optical axis of the beam of light to form the inclined light sheet; and
causing the inclined light sheet from the cylindrical lens to form parallel light in the first direction D1, and directing the inclined light sheet to the flow cell; and
directing the flat sheet surface of the inclined light sheet to the flow cell in order to obtain the plurality of two-dimensional cross sectional images of the particles which pass through the flat sheet surface of the inclined light sheet; and
wherein obtaining the cross sectional images of the particles further comprises obtaining the plurality of two-dimensional cross sectional images with a light collecting optical system having an optical axis angled with respect to an optical axis of the beam of light at a location where the beam of light impinges the flow cell.

16. The particle imaging method of claim 15, further comprising:
generating a 3-dimensional image of particle based on overlaying the plurality of two-dimensional cross sectional images of the particle sequentially obtained over the interval of time by the imaging element.

17. The particle imaging method of claim 16, further comprising:
calculating an amount of movement of the plurality of two-dimensional cross sectional images of the particle on an imaging surface of the imaging element based on at least the amount of movement of the particle in the flow cell and the angle of the inclined light sheet in the flow direction of the sample; and generating the 3-dimensional image of a single particle based on the plurality of two-dimensional cross sectional images sequentially obtained by the imaging element relative to the single particle.

18. The particle imaging method of claim 16, further comprising:

correcting a size of at least one of the plurality of two-dimensional cross sectional images obtained by the imaging element based on the predetermined angle.

19. The particle imaging method of claim 15, further comprising:

enlarging a depth of field.

20. The particle imaging device of claim 1, wherein:

a length of the light sheet in the first direction D1 is at least as long as a width of the flow cell in the first direction D1.

21. The particle imaging device of claim 1, wherein:

the optical axis of the light collecting optical system is substantially perpendicular to the optical axis of the beam of light at a location where the beam of light impinges the flow cell.

\* \* \* \* \*